United States Patent
Datta et al.

(10) Patent No.: US 11,015,008 B2
(45) Date of Patent: *May 25, 2021

(54) THERMOPLASTIC VULCANIZATES AND COMPOSITIONS THEREFROM

(71) Applicant: ExxonMobil Chemical Patents Inc., Baytown, TX (US)

(72) Inventors: Sudhin Datta, Houston, TX (US); Andy H. Tsou, Houston, TX (US); Ron Walker, Pearland, TX (US); Krishnan Anantha Narayana Iyer, Pearland, TX (US); Rhutesh K. Shah, Katy, TX (US); Hamidreza Khakdaman, Houston, TX (US); Sebastian Vasquez, Houston, TX (US); Feng Li, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,910

(22) Filed: Mar. 18, 2019

(65) Prior Publication Data

US 2019/0309115 A1 Oct. 10, 2019

Related U.S. Application Data

(60) Provisional application No. 62/653,734, filed on Apr. 6, 2018.

(51) Int. Cl.
| | |
|---|---|
| *C08L 23/16* | (2006.01) |
| *C08F 236/04* | (2006.01) |
| *C08F 210/06* | (2006.01) |
| *C08F 210/02* | (2006.01) |
| *C08L 23/14* | (2006.01) |
| *C08J 3/21* | (2006.01) |
| *C08J 3/24* | (2006.01) |
| *C08F 236/20* | (2006.01) |
| *C08F 210/18* | (2006.01) |

(52) U.S. Cl.
CPC ........ *C08F 236/045* (2013.01); *C08F 210/02* (2013.01); *C08F 210/06* (2013.01); *C08J 3/212* (2013.01); *C08J 3/24* (2013.01); *C08L 23/142* (2013.01); *C08L 23/16* (2013.01); *C08F 210/18* (2013.01); *C08F 236/20* (2013.01); *C08F 2500/03* (2013.01); *C08F 2500/12* (2013.01); *C08F 2500/17* (2013.01); *C08F 2500/21* (2013.01); *C08F 2500/24* (2013.01); *C08L 2205/025* (2013.01); *C08L 2205/03* (2013.01); *C08L 2205/08* (2013.01); *C08L 2207/02* (2013.01); *C08L 2207/10* (2013.01); *C08L 2312/00* (2013.01); *C08L 2312/02* (2013.01)

(58) Field of Classification Search
CPC ........ C08L 23/12; C08L 23/142; C08L 23/16; C08L 2205/03; C08L 2207/02; C08L 2207/10; C08L 2312/00; C08L 2205/022; C08L 2312/02; C08L 2208/08; C08L 2205/025; C08J 3/24; C08J 3/212; C08J 3/005; C08J 2423/12; C08J 2323/16; C08F 210/06; C08F 210/02; C08F 236/045; C08F 4/65927; C08F 2500/24; C08F 2500/21; C08F 4/65908; C08F 2500/17; C08F 236/20; C08F 210/18; C08F 2500/12; C08F 2500/03; C08K 5/0025

See application file for complete search history.

(56) References Cited

U.S. PATENT DOCUMENTS

| | | |
|---|---|---|
| 9,352,537 B2 | 5/2016 | Fuchs et al. |
| 2007/0129493 A1 | 6/2007 | Sahnoune et al. |
| 2012/0208962 A1 | 8/2012 | Walton et al. |
| 2015/0021816 A1 | 1/2015 | D'Cruz et al. |
| 2016/0289410 A1 | 10/2016 | Yamaguchi et al. |
| 2019/0309151 A1 | 10/2019 | Datta et al. |
| 2019/0309152 A1* | 10/2019 | Datta et al. ............ C08F 210/02 |
| 2019/0309153 A1* | 10/2019 | Walker et al. ........ C08L 23/142 |

FOREIGN PATENT DOCUMENTS

WO 2017/119949 7/2017

OTHER PUBLICATIONS

Paul et al., Polymer Blends (or Alloys), Journal of Macromolecular Science, Reviews in Macromolecular Chemistry, 1980, vol. C18, No. 1, pp. 109-168.
Boyce et al., "Micromechanisms of deformation and recovery in thermoplastic vulcanizates," Journal of the Mechanics and Physics of Solids, 2001, vol. 49, vol. 6, pp. 1323-1342.

(Continued)

*Primary Examiner* — Terressa Boykin

(57) ABSTRACT

Disclosed is the preparation of thermoplastic vulcanizates with reduced crosslinked rubber dispersion sizes and dispersity. The thermoplastic vulcanizates include a polypropylene matrix phase in which cross-linked rubber particles are dispersed. The thermoplastic vulcanizates include the reaction product of a mixture that includes at least 10 wt % of isotactic polypropylene at least 30 wt % of an amorphous propylene-ethylene-diene terpolymer containing at least 60 wt % propylene-derived units and less than or equal to 25 wt % of ethylene-derived units; at least 10 wt % of a diluent and at least 0.015 wt % of at least one curative. The mixture is preferably formed without adding an ethylene-propylene-diene terpolymer.

28 Claims, 11 Drawing Sheets

(56) References Cited

OTHER PUBLICATIONS

Boyce et al., "Micromechanics of cyclic softening in thermoplastic vulcanizates," Journal of the Mechanics and Physics of Solids, 2001, vol. 49, vol. 6, pp. 1343-1360.
L. A. Utracki, "Polymer Alloys and Blends—Thermodynamics and Rheology", Hanser Publishers, New York, 1990, Part 3, pp. 131-247.

* cited by examiner

THERMOPLASTIC VULCANIZATES AND COMPOSITIONS THEREFROM

PRIORITY CLAIM

This application claims priority to and the benefit of U.S. Ser. No. 62/653,734 filed Apr. 6, 2018 and is incorporated by reference in its entirety.

STATEMENT OF RELATED APPLICATIONS

This invention also relates to:
1) U.S. Ser. No. 16/356,951, filed concurrently herewith, entitled "Thermoplastic Vulcanizate Compositions";
2) U.S. Ser. No. 16/356,894, filed concurrently herewith, entitled "Compatibilized Thermoplastic Vulcanizate Compositions";
3) U.S. Ser. No. 16/356,588, filed concurrently herewith, entitled "Processes for Producing High Propylene Content PEDM using Tetrahydroindacenyl Catalyst Systems", which claims priority to and the benefit of U.S. Ser. No. 62/644,971, filed Mar. 19, 2018;
4) U.S. Ser. No. 16/356,772, filed concurrently herewith, entitled "Processes for Producing High Propylene Content PEDM Having Low Glass Transition Temperatures Using Tetrahydroindacenyl Catalyst Systems"; which claims priority to and the benefit of U.S. Ser. No. 62/644,971, filed Mar. 19, 2018;
5) U.S. Ser. No. 16/356,826, filed concurrently herewith, entitled "Multiple Non-Coordinating Anion Activators for Propylene-Ethylene-Diene Monomer Polymerization Reactions"; and
6) U.S. Ser. No. 16/356,844, filed concurrently herewith, entitled "Compatibilized Thermoplastic Vulcanizate Compositions", claims priority to and the benefit of U.S. Ser. No. 62/653,734 filed Apr. 6, 2018.

FIELD

The present disclosure relates to thermoplastic vulcanizate compositions and methods for preparing them.

BACKGROUND

The first commercial thermoplastic vulcanizate, or TPV, was Santoprene™, which was introduced early in the 1980s. Thermoplastic vulcanizates are thermoplastic elastomers, not thermoset rubbers, and can be processed or re-processed as thermoplastics. Thermoplastic vulcanizates differ from thermoplastics at least by inclusion of dispersed vulcanized rubber particles. Vulcanization, or crosslinking, of rubbers in TPVs is necessary to keep the rubber, which is the majority blend component, as the dispersed phase, instead of the continuous phase. Following the Paul-Barrow continuity criterion (D. R. Paul and J. W. Barlow, J. Maromol. Sci., Rev. Macromol. Chem., C18, 109, (1980)), where phi 1/phi 2=eta 1/eta 2, the phase with infinite viscosity, such as crosslinked rubbers, would stay dispersed. This allows the packing of a maximum amount of rubber dispersion in a plastic matrix without rubber phase inversion. The maximum packing volume percent is limited by packing physics and is typically less than 70 vol %. By squeezing in greater than 60 vol % of crosslinked rubber dispersions inside a plastic matrix, the plastic matrix becomes inter-connecting plastic ligaments sandwiched in between dispersed crosslinked rubber particles.

Without being bound by any theory, the elasticity of a TPV is thought to derive from these thin plastic ligaments sandwiched between dispersed rubber particles. Based on experimental findings and theoretic modeling (e.g., as by M. C. Boyce, S. Socrate, K. Kear, O. Yeh, and K. Shaw, J. Mech. Phys. Solids, 49, 1323, (2001), and J. Mech. Phys. Solids, 49, 1343, (2001), these thin plastic ligaments kink or plastic flow during TPV deformation by the incompressible deformation of sandwiching crosslinked rubber dispersions. Subsequently, these plastic ligament kinks act as spatial registrations to allow elastic recovery and to deliver elasticity Thinner plastic ligaments would be easily deformed and also yield easily, for plastic flow/kink formation, relative to thick plastic ligaments. If the plastic matrix has plastic patches that are relatively large between dispersed rubber particles, these plastic flows and kink developments are not possible and this leads to poorer elastic properties. Rubber dispersion size and uniformity are important to create a uniform plastic ligament network. Greater uniformity of the plastic ligament network promotes the elastic properties of a TPV.

The particle size and uniformity of the rubber dispersion in a TPV thus can constrain the selection of plastic and rubber components for the preparation of a TPV. For a Santoprene™ TPV, which is a TPV based on isotactic polypropylene (iPP) plastic matrix, and crosslinked ethylene-propylene-diene terpolymer (EPDM) rubber dispersions, it is important to use fractional melt-flow rate (MFR) iPP to blend with EPDM in a mixer before the introduction of curatives. Since EPDM typically has much higher molecular weight (MW) than that of an iPP, use of low MFR and high MW iPP provides helpful viscosity matching during initial blending. Viscosity matching allows stress transfer across blend interfaces to produce finer dispersions (L. A. Utracki, "Polymer Alloys and Blends—Thermodynamics and Rheology", Hanser Publishers, New York, (1990)). In the case of preparing TPVs, viscosity matching promotes fine iPP dispersions inside the EPDM matrix. Once the curatives are introduced, phase inversion occurs and crosslinked EPDM becomes the dispersed phase. Although decent dispersion of crosslinked rubber can be obtained in a TPV by judicious selections of plastic and rubber components (for viscosity matching) and of twin screw extrusion elements (for phase inversion and rubber dispersion in the production process), crosslinked rubber dispersion uniformity in a TPV can be further improved for better elastic properties.

The elasticity of a TPV is actually derived from these thin plastic ligaments sandwiched in between rubber dispersions. Based on experimental finding and theoretic modeling (M. C. Boyce, S. Socrate, K. Kear, O. Yeh, and K. Shaw, J. Mech. Phys. Solids, 49, 1323, (2001), and J. Mech. Phys. Solids, 49, 1343, (2001)), these thin plastic ligaments kink or plastic flow during TPV deformation by the incompressible deformation of sandwiching crosslinked rubber dispersions. Subsequently, these plastic ligament kinks act as spatial registrations to allow elastic recovery and to deliver elasticity. Thinner plastic ligaments would be easily deformed and yielded, for plastic flow/kink formation, relative to thick plastic ligaments. If the plastic matrix has plastic patches that are relative large in between rubber dispersions, these required plastic flows and kink developments would not have been possible and could lead to poorer elastic properties.

This rubber dispersion uniformity requirement in a TPV thus constrains the selection of plastic and rubber components for the preparation of a TPV. For a Santoprene, which is a TPV based on isotactic polypropylene plastic matrix, iPP, and crosslinked ethylene-propylene-diene terpolymer rubber dispersions, EPDM, it is critical to used fractional MFR iPP to blend with EPDM in an extruder before the introduction of curatives. Since EPDM typically has much higher molecular weight than that of an iPP, low MFR and high MW iPP is necessary to provide viscosity matching during the initial blending inside an extruder. Viscosity matching is necessary to allow stress transfer across blend interfaces for finer dispersions (L. A. Utracki, "Polymer Alloys and Blends—Thermodynamics and Rheology", Hanser Publishers, New York, (1990)), in this case, it is to ensure fine iPP dispersions inside the EPDM matrix. Once the curatives are introduced, phase inversion occurs and cross-linked EPDM becomes the dispersed phase. However, this phase inversion process is difficult to control due to the tremendous increases in viscosity once EPDM is cross-linked. Although decent dispersion of crosslinked rubber can be obtained in a TPV by judicious selections of plastic and rubber components (for viscosity matching) and of twin screw extrusion elements (for phase inversion and rubber dispersion), crosslinked rubber dispersion uniformity in a TPV can be further improved for better elastic properties.

SUMMARY

In the present disclosure, a crosslinkable thermoset rubber, comprising (or consisting of, or consisting essentially of) one or more propylene-ethylene-diene terpolymer(s) (PEDM), is added to iPP prior to phase inversion during dynamic vulcanization. The PEDM can be synthesized by organometallic coordinative insertion polymerization of propylene, ethylene, and diene—with majority propylene, preferably greater than 50 (alternately 60, alternately 80) wt % by weight of the PEDM terpolymer. Using PEDM in polymer blends can suppress droplet coalescence for the rubber, reduce interfacial tension, and lead to finer dispersions (L. A. Utracki, "Polymer Alloys and Blends—Thermodynamics and Rheology", Hanser Publishers, New York, (1990)). Using a PEDM rubber during TPV preparation prior to vulcanization can provide fine rubber dispersions, which, after vulcanization and phase inversion, provide fine dispersions of vulcanized rubber inside the TPV with a result of improved mechanical toughness.

Accordingly, disclosed herein is a thermoplastic vulcanizate comprising a polypropylene matrix phase in which cross-linked rubber particles are dispersed, the thermoplastic vulcanizate comprising the reaction product of a mixture comprising:
  (a) at least 10 wt % of isotactic polypropylene;
  (b) at least 30 wt % of a propylene-ethylene-diene terpolymer (PEDM) containing at least 60 wt % propylene-derived units and less than or equal to 25 wt % of ethylene-derived units, wherein the PEDM is amorphous; and
  (c) at least 0.015 wt % of at least one curative,
  wherein the mixture is formed without adding an ethylene-propylene-diene terpolymer (EPDM), i.e., EPDM is absent, and the percentages of components (a) to (c) are based on the total weight of the mixture.

In some embodiments, the reaction product of the mixture contains at least 10 wt % of a diluent.

In some embodiments, the thermoplastic vucanizate contains 10 to 30 wt % of a diluent.

In some embodiments, the PEDM comprises 5 to 18 wt % of ethylene-derived units.

In some embodiments, the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

In some embodiments, the PEDM has a viscosity from 10 to 90 MST (5+4) at 230° C.

In some embodiments, the amount of PEDM is from 35 to 70 wt % of the mixture.

In some embodiments, the amount of PEDM is from 40 to 60 wt % of the mixture.

In some embodiments, the particle size dispersity index (PSDI) of the rubber particles is less than 3.

In some embodiments, the PEDM has a heat of fusion (Hf) which is undetectable.

Also presently disclosed is a thermoplastic vulcanizate comprising an isotactic polypropylene matrix phase in which cross-linked rubber particles are dispersed, the thermoplastic vulcanizate comprising the reaction product of a mixture comprising:
  (a) 20 to 30 wt % of isotactic polypropylene (iPP);
  (b) 35 to 70 wt % of a propylene-ethylene-diene terpolymer (PEDM) containing at least 60 wt % propylene-derived units and less than or equal to 25 wt % of ethylene-derived units, wherein the PEDM is amorphous;
  (c) optionally, 10 to 30 wt % of a diluent;
  (d) optionally, 0 to less than 30 wt % of an ethylene-propylene-diene terpolymer (EPDM) containing at least 50 wt % of ethylene-derived units;
  (e) 0.5 to 5.0 wt % of at least one curative;
  wherein the percentages of components (a) to (e) are based on the total weight of the mixture.

In some embodiments, the PEDM comprises 5 to 18 wt % of ethylene-derived units.

In some embodiments, the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

In some embodiments, the PEDM has a viscosity from 10 to 90 MST (5+4) at 230° C.

In some embodiments, the amount of PEDM is from 40 to 60 wt % of the mixture.

In some embodiments, the particle size dispersity index (PSDI) of the rubber particles is less than 3.

In embodiments, the PEDM has a heat of fusion (Hf) which is undetectable.

In embodiments, the PEDM has a melting point (mp also referred to as Tm) which is undetectable.

In some embodiments, the thermoplastic vulcanizate further comprises up to 20 wt % of an ethylene-propylene-diene terpolymer (EPDM) containing at least 50 wt % of ethylene-derived units.

The present disclosure also encompasses a process for producing a thermoplastic vulcanizate (TPV) comprising:
  i) providing a mixture comprising:
    (a) at least 10 wt % of isotactic polypropylene;
    (b) at least 30 wt % of a propylene-ethylene-diene terpolymer (PEDM) containing at least 60 wt % propylene-derived units and less than or equal to 25 wt % of ethylene-derived units, wherein the PEDM is amorphous;
    (c) optionally, up to 30 wt % of a diluent;
    (d) optionally, 0 to less than 30 wt % of an ethylene-propylene-diene terpolymer (EPDM) containing at least 50 wt % of ethylene-derived units;
    (e) at least 0.015 wt % of at least one curative;
    wherein the mixture is preferably provided without an ethylene-propylene-diene terpolymer (EPDM), and the percentages of components (a) to (e) are based on the total weight of the mixture; and (ii) reacting the mixture under shear and at a temperature above the melting point of the polypropylene to at least partially cross-link the PEDM and produce a polypropylene matrix phase in which cross-linked rubber particles are dispersed.

The present disclosure also encompasses a process for producing a thermoplastic vulcanizate (TPV) comprising:
i) providing a mixture comprising:
(a) 20 to 30 wt % of isotactic polypropylene (iPP);
(b) 35 to 70 wt % of a propylene-ethylene-diene terpolymer (PEDM) containing at least 60 wt % propylene-derived units and less than or equal to 25 wt % of ethylene-derived units, wherein the PEDM is amorphous;
(c) optionally, 10 to 30 wt % of a diluent;
(d) optionally, 0 to less than 30 wt % of an ethylene-propylene-diene terpolymer (EPDM) containing at least 50 wt % of ethylene-derived units;
(e) 0.5 to 5.0 wt % of at least one curative;
wherein the percentages of components (a) to (e) are based on the total weight of the mixture;
(ii) reacting the mixture under shear and at a temperature above the melting point of the polypropylene to at least partially cross-link the PEDM and produce a polypropylene matrix phase in which cross-linked rubber particles are dispersed.

In some embodiments, the process for producing the thermoplastic vulcanizate contains 10-30 wt % of a diluent.

In some embodiments, the step of reacting (ii) is performed in a twin-screw extruder.

In some embodiments, the amount of PEDM is from 35 to 70 wt % of the mixture.

In some embodiments, the amount of PEDM is from 40 to 60 wt % of the mixture.

In some embodiments, the particle size dispersity index (PSDI) of the rubber particles is less than 3.

In some embodiments, the PEDM has a heat of fusion (Hf) which is undetectable.

In some embodiments, the PEDM has a melting point (mp) which is undetectable.

In some embodiments, the PEDM comprises 5 to 18 wt % of ethylene-derived units

In some embodiments, the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

In some embodiments, the PEDM has a viscosity from 10 to 90 MST (5+4) at 230° C.

In some embodiments, the EPDM is absent from the thermoplastic vulcanizate.

DETAILED DESCRIPTION

Figure 1A:
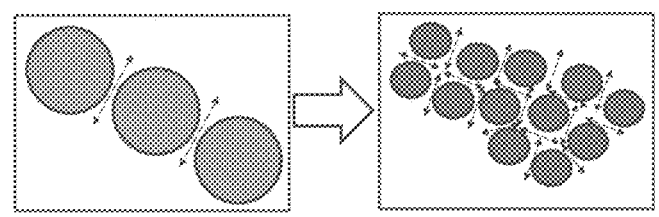
FIG. 1A illustrates rubber dispersion size and plastic ligament formation (left: large dispersions (only 2 ligaments), right: small dispersions (16 ligaments), both have the same rubber volume percent).
Figure 1B:
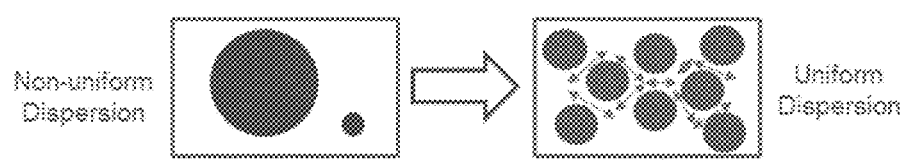
FIG. 1B illustrates rubber dispersion uniformity and plastic ligament formation (left: poor dispersion uniformity, right: good dispersion uniformity, both have the same rubber volume percent).

In the present disclosure, a crosslinkable thermoset rubber, very compatible and almost miscible with iPP, is added to iPP prior to phase inversion by vulcanization. Such a thermoset rubber is composed of propylene, ethylene and a crosslinkable diene, containing a predominant amount of propylene by weight of the polymer. The crosslinkable thermoset rubber is typically synthesized by organometallic coordinative insertion polymerization of propylene, ethylene and diene, with a majority (generally greater than 50 (alternately 60, alternately 80) wt %) propylene, and is called a propylene-ethylene-diene terpolymer (PEDM). Utilizing PEDM compatible rubber in polymer blends can suppress droplet coalescence, reduce interfacial tension, and lead to finer dispersions (L. A. Utracki, "Polymer Alloys and Blends-Thermodynamics and Rheology", Hanser Publishers, New York, (1990)). Adding a PEDM compatible rubber during TPV preparation prior to vulcanization can provide fine PP dispersions, which, after vulcanization and phase inversion, lead to fine PEDM dispersions inside the TPV, which provides a TPV with improved mechanical toughness. FIG. 1A shows that the number of plastic ligaments in a network increases with decreasing size of the rubber particles dispersed in the plastic matrix phase. FIG. 1B shows how increasing the uniformity of the rubber particle size dispersion provides a more distributed and more uniform plastic filament network having thinner ligaments.

For example, a TPV composition as presently disclosed can be one that has a particle size dispersity index (PSDI) of less than 6.5, alternately less than 5.0, although more typically the PSDI in a TPV composition as presently disclosed is less than 4.0, or less than 3.5, or less than 3.0. For example, the PSDI of a TPV according to the present disclosure can be from 1.2 to 6.5, or from 1.2 to 5, or from 1.2 to 4, or from 1.2 to 3.5, or from 1.2 to 3.0, or from 1.5 to 3.0.

TPV Compositions

Thermoplastic vulcanizate (TPV) compositions of various embodiments may comprise, consist essentially of, or consist of: (a) an at least partially vulcanized rubber component dispersed within a continuous thermoplastic matrix; (b) oil; and, optionally, (c) one or more additives (e.g., one or more fillers, foaming agents, or the like). As used in this context, "consist essentially of" means that the TPV composition is free of other materials except those minor impurities (e.g., 0.1 wt % or less) that one would typically expect in normal commercial production operations. For instance, a single process line may be used in a continuous process to create multiple different types of materials in series, and some residuals (e.g., residual polymer, monomer, curative, additives, or other material) from previous product campaigns may acceptably be left in such equipment and thus incorporated into a TPV product.

Composition TPVs are formed by dynamically vulcanizing a TPV formulation. The TPV formulation of various embodiments comprises (i) a rubber component (which may or may not be oil-extended); (ii) a thermoplastic resin; (iii) an optional, polyolefin-based, typically propylene-based, elastomer (PBE) (which may be especially useful in compositions comprising Santoprene™) or a hydrogenated tri-block copolymerized thermoplastic elastomer (TPE—for example hydrogenated Kraton™ (Kraton Polymers)); (iv) a vulcanizing agent or curative; (v) processing oil; and (vi) optionally, one or more additives (including, e.g., cure accelerators, metal oxides, acid scavengers, flame retardants, fillers, stabilizers, and the like). A TPV product may therefore alternatively be considered and described as the reaction product of dynamic vulcanization of a TPV formulation or "melt", or as a "dynamically vulcanized alloy" (DVA).

A TPV composition can be prepared in which the rubber component is not vulcanized, but instead comprises polymer chains associated with one another by physical means and thus promoting the inversion of the rubber and plastic phases, such as hydrogen bonds, ionic aggregation, and phase transition (e.g., crystallization or a glass transition); thus, a TPV formulation not yet subjected to a covalent cross-linking chemical reaction can be prepared in which physical cross links can be removed by heating.

In embodiments of the invention herein, the TPV has an elongation at break of 200% or more, alternately 225% or more, alternately 250% or more, as determined by the method described herein.

In embodiments of the invention herein, the TPV has break stress of 3 MPa or more, alternately 4 MPa or more, alternately 5 MPa or more, as determined by ASTM D638.

In embodiments of the invention herein, the TPV has a tension set from 25% elongation of 7% or less, alternately 6% or less, alternately 5% or less, as determined by the method described herein.

In embodiments of the invention herein, the TPV has a tension set from 50% elongation of 14% or less, alternately 12% or less, alternately 10% or less, as determined by the method described herein.

In embodiments of the invention herein, the TPV has an number average particle size diameter of the rubber particles (PEDM, and EPDM if present) of 800 nm or less, alternately 700 nm or less, alternately 600 nm or less, as determined by the method described herein.

In embodiments of the invention herein, the TPV has a dispersity of crosslinked particle size diameter of the rubber particles (PEDM, and EPDM if present) of 1.6 or less, alternately 1.5 or less, alternately 1.4 or less, or 1.35 or less, as determined by the method described herein.

In embodiments of the invention herein, the TPV has:

1) an elongation at break of 200% or more, alternately 225% or more, alternately 250% or more;
2) a break stress of 3 MPa or more, alternately 4 MPa or more, alternately 5 MPa or more;
3) a tension set from 25% elongation of 7% or less, alternately 6% or less, alternately 5% or less;
4) a tension set from 50% elongation of 14% or less, alternately 12% or less, alternately 10% or less;
5) an number average particle size diameter of the rubber particles (PEDM, and EPDM if present) of 800 nm or less, alternately 700 nm or less, alternately 600 nm or less; and 6) a dispersity of crosslinked particle size diameter of the rubber particles (PEDM, and EPDM if present) of 1.6 or less, alternately 1.5 or less, alternately 1.4 or less, or 1.35 or less.

In embodiments of the process for the formation of the thermoplastic vulcanizate absent EPDM, it is more effective and simple process since it involves the blending of only one rubber (the PEDM) with one thermoplastic rather than two different rubbers (such as the PEDM and EPDM).

In embodiment of the process formation of the thermoplastic vulcanizate it is expected that the desirable fine morphology of the rubber with a narrow distribution of particle sizes will be achieved with less energy input during shear and in a shorter amount of time in the extruder with PEDM instead of EPDM rubber because of a closer match of composition and thus the solubility parameter of PEDM to the thermoplastic polypropylene Rubber Component The "rubber" component of TPV formulations or compositions generally is a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked. Generally, the term "rubber" refers to any natural or synthetic polymer exhibiting elastomeric properties, and may be used herein synonymously with "elastomer." The rubber component may comprise one rubber, or a mix of two or more rubbers.

In the TPV compositions presently disclosed, one or more PEDM rubbers are used as the rubber component. In the present disclosure, a propylene-ethylene-diene terpolymer rubber (PEDM) is used as a rubber. As explained above, incorporating a PEDM into the TPV formulation (or composition) provides an improvement in particle size distribution, measured as Dw/Dn and called "particle size dispersity index" (PSDI) with an attendant improvement in some physical properties of the resulting TPV composition. The improvement that is reduction, in PSDI is over and above that achieved by only viscosity matching the rubber and thermoplastic components. In any embodiment, the inventive TPV composition have a Dw/Dn (PSDI) of less than 8, or 7, or 6, or 5, or 4, or 3, or 2.5, or within a range from 1 or 2 to 2.5, or 3, or 4, or 5, or 6, or 7, or 8, alternately from 1 to 8, alternately from 1 to 7, alternately from 1.5 to 6, alternately from 2 to 4, alternately from 2 to 3.

In some embodiments, the rubber component can also include a minor amount of any ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. U.S. Pat. Nos. 3,037,954 and 4,811,628, hereby incorporated by reference in their entirety and for all purposes, describe TPVs having a polypropylene matrix and EPDM rubber component.

The EPDM rubber can be one that comprises from 50-80 wt % ethylene and 1-15 wt % ethylene norbornene, and preferably 49 to 5 wt % propylene, based on the weight of the EPDM rubber. More typically, the EPDM rubber can be one that comprises from 45-75 wt % ethylene and 2-10 wt % ethylene norbornene, or from 50-65% ethylene and 2 to 10% ethylene norbornene, with the balance preferably being propylene.

In some embodiments, the EPDM is substantially absent from the thermoplastic vulcanizate. In some embodiments, the EPDM is absent from the thermoplastic vulcanizate. In some embodiments, the EPDM is present at zero weight % of the thermoplastic vulcanizate.

In some embodiments, the EPDM is present at less than 20 wt %, alternately less than 15 wt %, alternately less than 10 wt %, alternately less than 5 wt %, alternately less than 2 wt %, alternately at less than 1 wt %, based upon the weight of the TPV. In some embodiments, the EPDM is present at less than 20 wt %, alternately less than 15 wt %, alternately less than 10 wt %, alternately less than 5 wt %, alternately less than 2 wt %, alternately at less than 1 wt %, alternately at less than 0.5 wt %, based upon the weight of the TPV.

In some embodiments, the EPDM is present 0.1 to 20 wt %, alternately 0.5 to 15 wt %, alternately 1 to 10 wt %, alternately 1.5 to 5 wt %, based upon the weight of the TPV.

Propylene-Ethylene-Diene Terpolymer

The "propylene-ethylene-diene terpolymer" as used herein may be any polymer comprising ethylene, propylene, a diene and other comonomers, such as styrene or norbornene. The term "polymer" refers to any carbon-containing compound having repeat units from one or more different monomers. Preferably the propylene-ethylene-diene based polymer comprises ethylene-derived units, propylene-derived units, and, optionally, diene-derived units. For example, the propylene-ethylene-diene terpolymer may be an ethylene propylene-α-olefin-diene terpolymer. The propylene-ethylene-diene terpolymers may be prepared by polymerizing ethylene and propylene with one or more dienes.

The optional comonomers may be linear or branched. Preferred linear comonomers include $C_4$ to $C_8$ α-olefins, more preferably 1-butene, 1-hexene, and 1-octene. Preferred branched comonomers include 4-methyl-1-pentene, 3-methyl-1-pentene, 2-ethyl-1-butene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

The propylene-ethylene-diene terpolymer may have an ethylene amount of from 2 wt % by weight to 45 wt % by weight of the PEDM terpolymer, or from 5 wt % to 35 wt %, or from 7 wt % to 25 wt %, or from 10 wt % to 25 wt %, based on the weight of the PEDM polymer. The balance of the propylene-ethylene-diene terpolymer comprises propylene and, optionally, one or more dienes.

Preferably, the propylene-ethylene-diene terpolymer comprises a diene content of from 1 wt % to 21 wt % based on the weight of the PEDM polymer, or from 1.5 wt % to 15 wt %, or from 2 wt % to 15 wt %, or 3 wt % to 10 wt %, or from 3 wt % to 8 wt %, based on the weight of the PEDM polymer. Other useful ranges include from 1 wt % to 18 wt %, or from 1 wt % to 15 wt %, or from 1 wt % to 10 wt %, or from 3 wt % to 12 wt %, or from 4 wt % to 12 wt % based on the weight of the PEDM polymer. In one or more embodiments, the propylene-ethylene-diene terpolymer may comprise 5-ethylidene-2-norbornene in an amount of from 1 wt % to 21 wt %, or from 1.5 wt % to 15 wt %, or from 3 wt % to 20 wt %, or from 3 wt % to 18 wt %, or from 3 wt % to 15 wt %, based on the weight of the PEDM polymer.

A PEDM used in the TPV presently disclosed can be one including 5 to 18% ethylene, 93 to 70 wt % propylene, and 2 to 12 wt % ethylene norbornene-derived units by weight of the PEDM.

The propylene-ethylene-diene terpolymer may have a weight average molecular weight (Mw) of 5,000,000 g/mol or less, a number average molecular weight (Mn) of 3,000,000 g/mol or less, a z-average molecular weight (Mz) of 10,000,000 g/mol or less, and a g' index of 0.95 or greater measured at the weight average molecular weight (Mw) of the polymer using isotactic polypropylene as the baseline, all of which may be determined by size exclusion chromatography as described below. The propylene-ethylene-diene terpolymer may have an Mn of from 5,000 to 5,000,000 g/mole, or from 10,000 to 1,000,000 g/mole, or from 20,000 to 500,000 g/mole, or from 30,000 to 400,000 g/mole.

The molecular weight distribution index (MWD=(Mw/Mn)), sometimes referred to as a "polydispersity index" (PDI), of the propylene-ethylene-diene terpolymer may be from 1.2 to 40. For example, the propylene-ethylene-diene terpolymer may have an MWD with an upper limit of 40, or 20, or 10, or 9, or 7, or 5, and a lower limit of 1.2, or 1.5, or 1.7. In one or more embodiments, the MWD of the propylene-ethylene-diene terpolymer is 1.5 to 7, or from 1.7 to 5.

The propylene-ethylene-diene terpolymer may have a g' index value (also referred to as branching index) of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l},$$

where $\eta_b$ is the intrinsic viscosity of the propylene-ethylene-diene terpolymer and $\eta_l$ is the intrinsic viscosity of a linear propylene polymer of the same viscosity-averaged molecular weight ($M_v$) as the propylene-ethylene-diene terpolymer. Thus, $\eta_l = K M_v^\alpha$, where K and α are measured values for linear polymers and unless otherwise indicated, α=0.705 and K=0.0002288 for linear propylene polymers.

The propylene-ethylene-diene terpolymer may have a density of from 0.83 $g/cm^3$ to 0.92 $g/cm^3$, or from 0.85 $g/cm^3$ to 0.91 $g/cm^3$, or from 0.85 $g/cm^3$ to 0.90 $g/cm^3$, at 23° C. as measured per the ASTM D-1505 test method.

The propylene-ethylene-diene terpolymer may have a melt flow rate (MFR, 2.16 kg weight at 230° C.), equal to or greater than 0.00001 g/10 min as measured according to the ASTM D-1238. Preferably, the MFR (2.16 kg at 230° C.) is from 0.0001 g/10 min to 200 g/10 min, or from 0.0001 g/10 min to 50 g/10 min, or from 0.0001 g/10 min to 5 g/10 min, or from 0.0001 g/10 min to 3 g/10 min.

The propylene-ethylene-diene terpolymer, prior to dilution with diluent, may have a Mooney viscosity MST (5+4) at 200° C., as determined according to ASTM D1646-99, as described in U.S. Pat. No. 6,806,336 in column 3, line 41 to column 4 line 45 and incorporated herein by reference, of greater than 5, or greater than 15, or greater than 35, or greater than 50 or greater than 70 or greater than 90.

The propylene-ethylene-diene terpolymer can have a Tg range, as determined by the DSC procedure described herein, from −25° C. to −2° C., or from −20° C. to −2° C., or from −15° C. to −2° C., or from −10° C. to −2° C.

The propylene ethylene diene copolymer is essentially devoid of crystallinity. Crystallinity for these statistical propylene ethylene copolymers with a predominant amount of propylene arises for catenated propylene residues, there is too little ethylene to have significant amount of catenated ethylene residues and thus crystallinity for ethylene sequences. Crystallinity in propylene residue catenation in polyolefins arises from the relative orientation of the pendant methyl groups on the alternate carbon atoms. Sequences of exclusive meso orientation or predominantly meso lead to isotactic crystallinity, sequences of random with mixtures meso and rac orientation lead to an absence of crystallinity: all at similar compositions and sequence distribution of the statistical propylene ethylene copolymers. The control of the meso or mixed orientation of the methyl groups is determined by the conditions for the synthesis typically the catalyst used and the polymerization conditions. The propylene ethylene copolymers of this invention are essentially devoid of crystallinity, preferably completely so as determined by DSC, by reason of having all of the catenated propylene residues in random orientations of meso and racemic. The determination of crystallinity in copolymers is difficult since in addition to the changes in the meso/random orientation of the propylene residues and the degrees of catenation, the absolute values of crystallinity are diluted by comingling with ethylene residues. Without wishing to be bound by theory, it is thought that when the propylene ethylene copolymers are made under the identical polymerization conditions, including catalysts, that even in the absence of ethylene or diene comonomers, the homo polypropylene made would be a mixture of random and meso orientation of the methyl residues and would thus have essentially no crystallinity as measured for this poly propylene by DSC. An alternate method would be consider the ratio of the heat of fusion of the copolymer, propylene ethylene diene to the corresponding polypropylene made under the same conditions. For this propylene ethylene diene copolymers this ration cannot be experimentally determined, therefore the heat of fusion for the linear PEDM is set at 207 J/g.

The propylene-ethylene-diene terpolymers (PEDM) herein are amorphous. For purposes of this invention and the claims thereto, "amorphous" means that the PEDM lacks crystallinity, which is indicated by having an undetectable heat of fusion and an undetectable melting point (i.e., no measurable thermal output during the DSC second heating cycle) as measured by differential scanning calorimetry according to the procedure described below.

The Differential Scanning calorimetry (DSC) procedure below is used to determine heat of fusion and melting temperature (or lack thereof) of the propylene-ethylene-diene terpolymer. The method is as follows: approximately 6 mg of material placed in microliter aluminum sample pan. The sample is placed in a Differential Scanning calorimeter (Perkin Elmer or TA Instrument Thermal Analysis System) and is heated from ambient to 210° C. at 10° C./minute and held at 210° C. for 5 minutes. Afterward, the sample is cooled down to −40° C. at 10° C./minute and this cooling curve is used to measure the Tg. The sample is held at −40° C. for 5 minutes and then heated from −40° C. to 210° C. at 10° C./minute. During the second heating cycle, appearance of melting indicates crystallinity and thus measured heat of fusion is used to compute the crystallinity. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature. No measureable thermal output during the DSC second heating cycle (e.g. no heat of fusion and no measureable melting point), indicate a lack of crystallinity.

The crystallinity of the propylene-ethylene-diene terpolymer may be expressed in terms of percentage of crystallinity (i.e., % crystallinity), as determined according to the DSC procedure described below. The propylene-ethylene-diene terpolymer has a % crystallinity of 0%. (The degree of crystallinity (%) is determined by dividing heat of fusion (in J/g) measured by the heat of fusion for 100% crystalline polypropylene which has the value of 207 J/g (B. Wunderlich, Thermal Analysis, Academic Press, 1990, pp. 417-431) and multiplying by 100. Preferred propylene-ethylene-diene terpolymers are amorphous having an undetectable heat of fusion, and thus a non-calculable % crystallinity, by DSC, e.g. 0%.

The propylene-ethylene-diene terpolymer may be a blend of discrete random propylene-ethylene-diene terpolymers as long as the polymer blend has the properties of the propylene-ethylene-diene terpolymer as described herein. The number of propylene-ethylene-diene terpolymers may be three or less, or two or less. In one or more embodiments, the propylene-ethylene-diene terpolymer may include a blend of two propylene-ethylene-diene terpolymers differing in the olefin content, the diene content, or the both. Preparation of such polymer blend may be found in US 2004/0024146 and US 2006/0183861, both hereby incorporated by reference in their entirety.

For example, the rubber component can be any propylene-ethylene-diene (PEDM) rubber, or PEDM-type rubber, for example, an PEDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. U.S. Pat. Nos. 3,037,954 and 4,811,628, hereby incorporated by reference in their entirety and for all purposes, describe TPVs having a polypropylene matrix.

The rubber component is preferably present in the TPV formulation in an amount from 30 to 70 wt % (of the TPV formulation or TPV composition). In some instances, the amount of the PEDM rubber is from 35 to 70 wt %, or from 40 to 65 wt %, or from 40 to 60 wt %, or from 43 to 58 wt % in a TPV formulation or TPV composition based on total weight of the TPV, excluding both of processing and extender oils, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation of some embodiments may optionally comprise 5 to 30 wt %, such as 10 to 25 wt % or 12 to 24 wt % (with ranges from any of the foregoing lows to any of the foregoing highs also contemplated) of extender oil, where the rubber component includes extender oil.

Alternatively, the rubber component amount in the TPV composition may be expressed in terms of wt % inclusive of any extender oil that may be present in the rubber component, but not including any oil added during processing ("processing oil"). In such cases, the rubber component (inclusive of extender oil) may be present in the TPV composition within the range from 35 to 80 wt %, preferably 45 to 70 wt %, such as 50 to 65 wt % (again, with ranges from any of the foregoing lows to any of the foregoing highs also contemplated in various embodiments.

The PEDM copolymers useful herein may also be prepared using an indecenyl catalyst compound in combination with an activator, and an optional support, as further described in concurrently filed applications: 1) U.S. Ser. No. 16/356,588, entitled "Processes for Producing High Propylene Content PEDM using Tetrahydroindacenyl Catalyst Systems", which claims priority to and the benefit of U.S. Ser. No. 62/644,971, filed Mar. 19, 2018; and 2) U.S. Ser. No. 16/356,772, entitled "Processes for Producing High Propylene Content PEDM Having Low Glass Transition Temperatures Using Tetrahydroindacenyl Catalyst Systems"; which claims priority to and the benefit of U.S. Ser. No. 62/644,971, filed Mar. 19, 2018.

The catalyst compound, optional support and activator may be combined in any order, and are combined typically prior to contacting the catalyst system with the monomer. In at least one embodiment, the catalyst compound is represented by formula (I):

$$T_y Cp'_m M G_n X_q \quad (I)$$

wherein:
Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups; M is a group 2, 3, 4, 5, or 6 transition metal, preferably group 4 transition metal, for example titanium, zirconium, or hafnium (preferably titanium);
T is a bridging group (such as dialkylsilylene, dialkylcarbylene, phen-1,2-diyl, substituted phen-1,2-diyl, cyclohex-1,2-diyl or substituted cyclohex-1,2-diyl). T is preferably $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl and $R^8$ and $R^9$ may optionally be bonded together to form a ring structure, and in a particular embodiment, $R^8$ and $R^9$ are not aryl);
y is 0 or 1, indicating the absence or presence of T;
G is a heteroatom group represented by the formula $JR^i_{z-y}$ where J is N, P, O or S, R' is a $C_1$ to $C_{100}$ hydrocarbyl group (such as a $C_1$ to $C_{20}$ hydrocarbyl group), and z is 2 when J is N or P, and z is 1 when J is O or S (preferably J is N and z is 2) ($R^i$ can be a linear, branched or cyclic $C_1$ to $C_{20}$ hydrocarbyl group, preferably independently selected from methyl, ethyl, propyl, butyl, pentyl, hexyl, heptyl, octyl, nonyl, decyl, phenyl, and isomers thereof, including t-butyl, cyclododecyl, cyclooctyl, preferably t-butyl and or cyclododecyl);
X is a leaving group (such as a halide, a hydride, an alkyl group, an alkenyl group or an arylalkyl group) and optionally two or more X may form a part of a fused ring or a ring system; m=1; n=1, 2 or 3; q=1, 2 or 3; and the sum of m+n+q is equal to the oxidation state of the transition metal (preferably 3, 4, 5, or 6, preferably 4); preferably m=1, n=1, q is 2, and y=1.

In at least one embodiment of formula (I), M is a group 4 transition metal (preferably Hf, Ti and/or Zr, preferably Ti). In at least one embodiment of formula (I), $JR^i_{z-y}$ is cyclododecyl amido, t-butyl amido, and or 1-adamantyl amido.

In at least one embodiment of formula (I), each X is, independently, selected from hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a benzyl, methyl, ethyl, propyl, butyl, pentyl, or chloro group.

In at least one embodiment of formula (I), the Cp' group may be substituted with a combination of substituent groups R. R includes one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. In at least one embodiment, substituent groups R have up to 50 non-hydrogen atoms, preferably from 1 to 30 carbon, that can also be substituted with halogens or heteroatoms or the like, provided that when Cp' is tetrahydro-s-indacenyl: 1) the 3 and/or 4 position is not aryl or substituted aryl, 2) the 3-position is not substituted with a group 15 or 16 heteroatom, 3) there are no additional rings fused to the tetrahydroindacenyl ligand, T is not bonded to the 2-position, and 5) the 5, 6, or 7-position (preferably the 6 position) is geminally disubstituted, preferably with two $C_1$-$C_{10}$ alkyl groups. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like.

In at least one embodiment of formula (I), the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, or a $C_1$ to $C_{20}$ hydrocarbyl substituted with an N, O, S and or P heteroatom or heteroatom containing group (typically having up to 12 atoms, including the N, O, S and P heteroatoms), provided that when Cp' is tetrahydro-s-indacenyl, the 3 and/or 4 position are not aryl or substituted aryl, the 3 position is not substituted with a group 15 or 16 heteroatom, and there are no additional rings fused to the tetrahydroindacenyl ligand, T is not bonded to the 2-position, and the 5, 6, or 7-position (preferably the 6 position) is geminally disubstituted, preferably with two $C_1$-$C_{10}$ alkyl groups.

In at least one embodiment of formula (I), the Cp' group is tetrahydro-as-indacenyl or tetrahydro-s-indacenyl which may be substituted.

In at least one embodiment of formula (I), y is 1, and T is a bridging group containing at least one group 13, 14, 15, or 16 element, in particular boron or a group 14, 15 or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent R* may join to form a substituted or unsubstituted, saturated, partially unsaturated or aromatic, cyclic or polycyclic substituent, and optionally any one or more adjacent R* and R' may join to form a substituted or unsubstituted, saturated, partially unsaturated or aromatic, cyclic or polycyclic substituent. Preferred examples for the bridging group T include —CH$_2$—, —CH$_2$CH$_2$—, —SiMe$_2$-, —SiPh$_2$-, —Si(Me)(Ph)-, —Si(CH$_2$)$_3$—, —Si(CH$_2$)$_4$—, —O—, —S—, —N(Ph)-, —P(Ph)-, —N(Me)-, —P(Me)-, —N(Et)-, —N(Pr)—, —N(Bu)-, —P(Et)-, —P(Pr)—, -(Me)$_2$SiOSi(Me)$_2$-, and —P(Bu)-. In a preferred embodiment of the present disclosure, when Cp' is tetrahydro-s-indacenyl and T is R*$_2$Si, then R* is not aryl. In some embodiments, R* is not aryl or substituted aryl.

In at least one embodiment, the catalyst compound is one or more bridged transition metal compounds represented by formula (II) or (III):

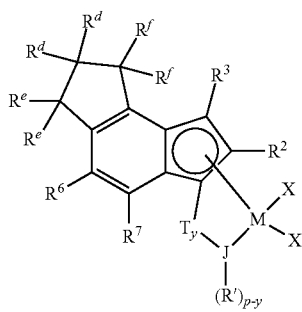

(III)

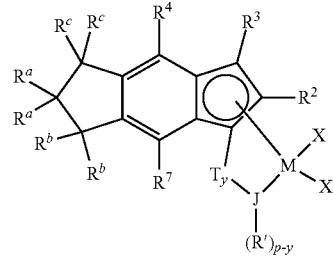

(II)

where M is a group 4 metal (such as Hf, Ti or Zr, preferably Ti);
J is N, O, S or P;
p is 2 when J is N or P, and is 1 when J is O or S (preferably J is N, y=1, and p=2);
each $R^a$, $R^b$, $R^c$, $R^d$, $R^e$ and $R^f$ are independently hydrogen or a $C_1$-$C_{10}$ alkyl (alternately a $C_2$-$C_{10}$ alkyl);
each $R^2$, $R^4$, $R^3$, $R^6$, and $R^7$ is independently hydrogen, or a $C_1$-$C_{50}$ substituted or unsubstituted hydrocarbyl, halocarbyl, silylcarbyl or germylcarbyl;
each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

In some embodiments of formulae II and III, y is 1 and T is $(CR^8R^9)_x$, $SiR^8R^9$ or $GeR^8R^9$ where x is 1 or 2, $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

In at least one embodiment of the present disclosure, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In at least one embodiment of the present disclosure, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$, $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, each $R^d$, $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclododecyl, adamantyl, or norbornyl.

In at least one embodiment of the present disclosure, T is $CR^8R^9$, $R^8R^9C$—$CR^8R^9$, $SiR^8R^9$ or $GeR^8R^9$ where $R^8$ and $R^9$ are independently selected from hydrogen or substituted or unsubstituted hydrocarbyl, halocarbyl, silylcarbyl and $R^8$ and $R^9$ may optionally be bonded together to form a ring structure, preferably each $R^8$ and $R^9$ is independently methyl, ethyl, propyl, butyl, pentyl, hexyl, heptyl, octyl, nonyl, decyl, benzyl, phenyl, methylphenyl or an isomer thereof, preferably methyl, ethyl, propyl, butyl, or hexyl. When $R^8$ and $R^9$ are optionally bonded together preferred bridges include substituted or unsubstituted phen-1,2-diyl, cyclohex-1,2-diyl, cyclopentamethylenesilylene, cyclotetramethylenesilylene, cyclotrimethylenesilylene and dibenzo[b,d]silolyl. Additionally, optionally any one or more adjacent $R^8$ and/or $R^9$ may join to form a substituted or unsubstituted, saturated, partially unsaturated or aromatic, cyclic or polycyclic substituent along with R'.

In at least one embodiment of the present disclosure, at least one of $R^8$ or $R^9$ is not aryl. In at least one embodiment of the present disclosure, $R^8$ is not aryl. In at least one embodiment of the present disclosure, $R^9$ is not aryl. In at least one embodiment of the present disclosure, $R^8$ and $R^9$ are not aryl.

In at least one embodiment of the present disclosure, $R^8$ and $R^9$ are independently $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^4$, and $R^7$ is independently hydrogen or hydrocarbyl. Each $R^2$, $R^3$, $R^4$, and $R^7$ can be independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^6$, and $R^7$ is independently hydrogen or hydrocarbyl. Each $R^2$, $R^3$, $R^6$, and $R^7$ can be independently hydrogen or a $C_1$-$C_{10}$ alkyl, preferably methyl, ethyl, propyl, butyl, pentyl, hexyl, heptyl, octyl, nonyl, decyl, or an isomer thereof.

In at least one embodiment of the present disclosure, $R^2$ is a $C_1$-$C_{10}$ alkyl and $R^3$, $R^4$, and $R^7$ are hydrogen.

In at least one embodiment of the present disclosure, $R^2$ is a $C_1$-$C_{10}$ alkyl and $R^3$, $R^6$, and $R^7$ are hydrogen.

In at least one embodiment of the present disclosure, $R^2$, $R^3$, $R^4$, and $R^7$ are hydrogen. In at least one embodiment of the present disclosure, $R^2$, $R^3$, $R^6$, and $R^7$ are hydrogen.

In at least one embodiment of the present disclosure, $R^2$ is methyl, ethyl, or an isomer of propyl, butyl, pentyl or hexyl, and $R^3$, $R^4$, and $R^7$ are hydrogen. In at least one embodiment of the present disclosure, $R^2$ is methyl, ethyl, or an isomer of propyl, butyl, pentyl or hexyl, and $R^3$, $R^6$, and $R^7$ are hydrogen.

In at least one embodiment of the present disclosure, $R^2$ is methyl and $R^3$, $R^4$, and $R^7$ are hydrogen. In at least one embodiment of the present disclosure, $R^2$ is methyl and $R^3$, $R^6$, and $R^7$ are hydrogen.

In at least one embodiment of the present disclosure, $R^3$ is hydrogen. In at least one embodiment of the present disclosure, $R^2$ is hydrogen.

In at least one embodiment of the present disclosure, $R^2$ and each $R^a$ is independently a $C_1$-$C_{10}$ alkyl and $R^3$, $R^4$, $R^7$ and each $R^b$ and $R^c$ are hydrogen.

In at least one embodiment of the present disclosure, $R^2$ and each $R^d$ is a $C_1$-$C_{10}$ alkyl and $R^3$, $R^6$, $R^7$ and each $R^e$ and $R^f$ are hydrogen.

In at least one embodiment of the present disclosure, $R^2$ and each $R^a$ is independently a methyl, ethyl, propyl, butyl, pentyl, hexyl, heptyl, octyl, nonyl, decyl, or an isomer thereof, and $R^3$, $R^4$, $R^7$ and each $R^b$ and $R^c$ are hydrogen.

In at least one embodiment of the present disclosure, $R^2$ and each $R^d$ is a methyl, ethyl, propyl, butyl, pentyl, hexyl, heptyl, octyl, nonyl, decyl, or an isomer thereof, and $R^3$, $R^6$, $R^7$ and each $R^e$ and $R^f$ are hydrogen.

In at least one embodiment of the present disclosure, R' is $C_1$-$C_{100}$ or $C_1$-$C_{30}$ substituted or unsubstituted hydrocarbyl.

In at least one embodiment of the present disclosure, R' is $C_1$-$C_{30}$ substituted or unsubstituted alkyl (linear, branched, or cyclic), aryl, alkaryl, or heterocyclic group. In at least one embodiment of the present disclosure, R' is $C_1$-$C_{30}$ linear, branched or cyclic alkyl group.

In at least one embodiment of the present disclosure, R' is methyl, ethyl, or any isomer of propyl, butyl, pentyl, hexyl, heptyl, octyl, nonyl, decyl, undecyl, or dodecyl. In at least one embodiment of the present disclosure, R' is a cyclic or polycyclic hydrocarbyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, T is selected from diphenylmethylene, dimethylmethylene, 1,2-ethylene, phen-1,2-diyl, cyclohex-1,2-diyl cyclotrimethylenesilylene, cyclotetramethylenesilylene, cyclopentamethylenesilylene, dibenzo[b, d]silolyl, dimethylsilylene, diethylsilylene, methylethylsilylene, and dipropylsilylene.

In at least one embodiment of the present disclosure, each $R^a$ is independently methyl, ethyl, propyl, butyl, pentyl or hexyl. In at least one embodiment of the present disclosure, each $R^a$ is independently methyl or ethyl. Each $R^a$ can be methyl.

In at least one embodiment of the present disclosure, each $R^d$ is independently methyl, ethyl, propyl, butyl, pentyl or hexyl. In at least one embodiment of the present disclosure, each $R^d$ is independently methyl or ethyl. Each $R^d$ can be methyl.

In at least one embodiment of the present disclosure, each $R^d$ and each $R^e$ and $R^f$ are independently hydrogen, methyl, ethyl, propyl, butyl, pentyl or hexyl. In at least one embodiment of the present disclosure, each $R^d$ is independently hydrogen, methyl, or ethyl.

In at least one embodiment of the present disclosure, each $R^b$ and $R^c$ is hydrogen. In at least one embodiment of the present disclosure, each $R^e$ and $R^f$ is hydrogen.

In at least one embodiment of the present disclosure, each X is hydrocarbyl, halocarbyl, or substituted hydrocarbyl or halocarbyl.

In at least one embodiment of the present disclosure, X is methyl, benzyl, or halo where halo includes fluoro, chloro, bromo and iodido.

In at least one embodiment of the present disclose, both X are joined together to form a C4-C20 diene ligand such as 1,3-butadiene, 1,3-pentadiene, 2-methyl-1,3-pentadiene, 2,4-dimethylpentadiene and the like.

In at least one embodiment of formula (II) of the present disclosure: 1) $R^3$ and/or $R^4$ are not aryl or substituted aryl, 2) $R^3$ is not directly bonded to a group 15 or 16 heteroatom, and 3) adjacent $R^4$, $R^c$, $R^a$ or $R^7$ do not join together to form a fused ring system, and 4) each $R^a$ is a $C_1$ to $C_{10}$ alkyl (preferably methyl, ethyl, propyl, butyl, pentyl, hexyl, heptyl, octyl, nonyl, decyl, or an isomer thereof).

In a preferred embodiment of the present disclosure, T of any of formulas (I) to (III) is represented by the formula $ER^g_2$ or $(ER^g_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^g$ can form a cyclic structure including aromatic, partially saturated, or saturated cyclic or fused ring system. Preferably, T is a bridging group comprising carbon or silica, such as dialkylsilyl, preferably T is selected from —CH$_2$—, —CH$_2$CH$_2$—, —C(CH$_3$)$_2$—, Si(Me) 2, cyclotrimethylenesilylene (—Si(CH$_2$)$_3$—), cyclopentamethylenesilylene (—Si(CH$_2$)$_5$—) and cyclotetramethylenesilylene (—Si(CH$_2$)$_4$—).

In at least one embodiment, a catalyst compound is one or more of:
dimethylsilylene(2,6,6-trimethyl-1,5,6,7-tetrahydro-s-indacen-1-yl)(t-butylamido)M(R)$_2$;
dimethylsilylene(6,6-dimethyl-1,5,6,7-tetrahydro-s-indacen-1-yl)(t-butylamido)M(R)$_2$;
dimethylsilylene(2,7,7-trimethyl-3,6,7,8-tetrahydro-as-indacen-3-yl)(t-butylamido)M(R)$_2$;
dimethylsilylene(7,7-dimethyl-3,6,7,8-tetrahydro-as-indacen-3-yl)(t-butylamido)M(R)$_2$;
dimethylsilylene(2,6,6-trimethyl-1,5,6,7-tetrahydro-s-indacen-1-yl)(cyclododecylamido)M(R)$_2$;
dimethylsilylene(6,6-dimethyl-1,5,6,7-tetrahydro-s-indacen-1-yl)(cyclododecylamido)M(R)$_2$;
dimethylsilylene(2,7,7-trimethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
dimethylsilylene(2,6,6-trimethyl-1,5,6,7-tetrahydro-s-indacen-1-yl)(cyclohexylamido)M(R)$_2$;
dimethylsilylene(6,6-dimethyl-1,5,6,7-tetrahydro-s-indacen-1-yl)(cyclohexylamido)M(R)$_2$;
dimethylsilylene(2,7,7-trimethyl-3,6,7,8-tetrahydro-as-indacen-3-yl)(cyclohexylamido)M(R)$_2$;
dimethylsilylene(7,7-dimethyl-3,6,7,8-tetrahydro-as-indacen-3-yl)(cyclohexylamido)M(R)$_2$;
dimethylsilylene(2,6,6-trimethyl-1,5,6,7-tetrahydro-s-indacen-1-yl)(adamantylamido)M(R)$_2$;
dimethylsilylene(6,6-dimethyl-1,5,6,7-tetrahydro-s-indacen-1-yl)(adamantylamido)M(R)$_2$;
dimethylsilylene(2,7,7-trimethyl-3,6,7,8-tetrahydro-as-indacen-3-yl)(adamantylamido)M(R)$_2$;
dimethylsilylene(7,7-dimethyl-3,6,7,8-tetrahydro-as-indacen-3-yl)(adamantylamido)M(R)$_2$;
dimethylsilylene(2,6,6-trimethyl-1,5,6,7-tetrahydro-s-indacen-1-yl)(neopentylamido)M(R)$_2$;
dimethylsilylene(6,6-dimethyl-1,5,6,7-tetrahydro-s-indacen-1-yl)(neopentylamido)M(R)$_2$;
dimethylsilylene(2,7,7-trimethyl-3,6,7,8-tetrahydro-as-indacen-3-yl)(neopentylamido)M(R)$_2$;
dimethylsilylene(7,7-dimethyl-3,6,7,8-tetrahydro-as-indacen-3-yl)(neopentylamido)M(R)$_2$;
dimethylsilylene(2-methyl-6,6-diethyl-1,5,6,7-tetrahydro-s-indacen-1-yl)(t-butylamido)M(R)$_2$;
dimethylsilylene(6,6-diethyl-1,5,6,7-tetrahydro-s-indacen-1-yl)(t-butylamido)M(R)$_2$;
dimethylsilylene(2-methyl-7,7-diethyl-3,6,7,8-tetrahydro-as-indacen-3-yl)(t-butylamido)M(R)$_2$;
dimethylsilylene(7,7-diethyl-3,6,7,8-tetrahydro-as-indacen-3-yl)(t-butylamido)M(R)$_2$;
dimethylsilylene(2-methyl-6,6-diethyl-1,5,6,7-tetrahydro-s-indacen-1-yl)(cyclododecylamido)M(R)$_2$;
dimethylsilylene(6,6-diethyl-1,5,6,7-tetrahydro-s-indacen-1-yl)(cyclododecylamido)M(R)$_2$;
dimethylsilylene(2-methyl-7,7-diethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
diethylsilylene(2,6,6-trimethyl-1,5,6,7-tetrahydro-s-indacen-1-yl)(t-butylamido)M(R)$_2$;
diethylsilylene(6,6-dimethyl-1,5,6,7-tetrahydro-s-indacen-1-yl)(t-butylamido)M(R)$_2$;
diethylsilylene(2,7,7-trimethyl-3,6,7,8-tetrahydro-as-indacen-3-yl)(t-butylamido)M(R)$_2$;
diethylsilylene(7,7-dimethyl-3,6,7,8-tetrahydro-as-indacen-3-yl)(t-butylamido)M(R)$_2$;
dimethylsilylene(2-methyl-3,6,7,8-tetrahydro-as-indacen-3-yl)(cyclohexylamido)M(R)$_2$;
dimethylsilylene(2-methyl-3,6,7,8-tetrahydro-as-indacen-3-yl)(cyclododecylamido)M(R)$_2$;
dimethylsilylene(2-methyl-3,6,7,8-tetrahydro-as-indacen-3-yl)(adamantylamido)M(R)$_2$; and
dimethylsilylene(2-methyl-3,6,7,8-tetrahydro-as-indacen-3-yl)(t-butylamido)M(R)$_2$,
where M is selected from Ti, Zr, and Hf and R is selected from halogen or $C_1$ to $C_5$ alkyl, preferably R is a methyl group or a halogen group, preferably M is Ti.

In alternative embodiments, a catalyst system can include two or more different transition metal compounds. For purposes of the present disclosure one transition metal compound is considered different from another if they differ by at least one atom. For example "Me$_2$Si(2,7,7-Me$_3$-3,6,7,8-tetrahydro-as-indacen-3-yl)(cyclohexylamido)TiCl$_2$" is different from Me$_2$Si(2,7,7-Me$_3$-3,6,7,8-tetrahydro-as-indacen-3-yl)(n-butylamido)TiCl$_2$" which is different from Me$_2$Si(2,7,7-Me$_3$-3,6,7,8-tetrahydro-as-indacen-3-yl)(n-butylamido)HfCl$_2$.

In some embodiments, formulae I to III are referred to as mono-tetrahydroindacenyl compounds, precatalysts and/or catalysts.

In at least one embodiment, one mono-tetrahydroindacenyl compound as described herein is used in the catalyst system.

The terms "cocatalyst" and "activator" are used herein interchangeably and include a compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include non-coordinating anion compounds, alumoxane compounds, modified alumoxane compounds, and ionizing anion precursor compounds that abstract a reactive, 6-bound, metal ligand making the metal complex cationic and providing a charge-balancing noncoordinating or weakly coordinating anion.

In some embodiments, the catalyst compounds described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be supported on the same support. Likewise, two or more activators or an activator and co-activator may be supported on the same support.

Suitable solid particle supports are typically comprised of polymeric or refractory oxide materials, each being preferably porous. A support material can have an average particle size greater than 10 μm for use in embodiments of the present disclosure. A support material can be a porous support material, such as, talc, inorganic oxides, inorganic chlorides, for example magnesium chloride, and resinous support materials such as polystyrene polyolefin or polymeric compounds or any other organic support material and the like. A support material can be an inorganic oxide material including group-2, -3, -4, -5, -13, or -14 metal or metalloid oxides. A catalyst support materials can be silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

For further details, see concurrently filed applications: 1) U.S. Ser. No. 16/356,588, entitled "Processes for Producing High Propylene Content PEDM using Tetrahydroindacenyl Catalyst Systems", which claims priority to and the benefit of U.S. Ser. No. 62/644,971, filed Mar. 19, 2018; and 2) U.S. Ser. No. 16/356,772, entitled "Processes for Producing High Propylene Content PEDM Having Low Glass Transition Temperatures Using Tetrahydroindacenyl Catalyst Systems"; which claims priority to and the benefit of U.S. Ser. No. 62/644,971, filed Mar. 19, 2018, which are incorporated by reference herein.

Thermoplastic Component

TPV formulations and/or TPV compositions generally include a thermoplastic component comprising at least one olefinic thermoplastic resin. The thermoplastic resin may be a polymer or polymer blend considered by persons skilled in the art as being thermoplastic in nature, e.g., a solid polymer that softens and becomes molten when exposed to heat and returns to solid when cooled to 23° C. The olefinic thermoplastic component may contain one or more polyolefins, including polyolefin homopolymers and polyolefin copolymers.

The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$ to $C_{10}$ α-olefins.

The thermoplastic resin may have a melting temperature of at least 110° C. (230° F.), or at least 120° C. (248° F.), or at least 130° C. (266° F.), and may range from 110° C. (230° F.) to 170° C. (338° F.) or higher as measured by Differential Scanning calorimetry (DSC) as described in detail below.

The procedure for DSC analysis of the thermoplastic component is as follows: 6 to 10 mg of a sheet of the resin pressed at approximated 200° C. (392° F.) to 230° C. (446° F.) is removed with a punch die and then annealed at about 23° C. (74° F.) for 240 hours. At the end of this period, the sample is placed in a Differential Scanning calorimeter (Perkin Elmer 7 Series Thermal Analysis System) and cooled at a rate of 10° C. (50° F.)/min to −50° C. (−58° F.) to −70° C. (−274° F.). The sample is then heated at a rate of 20° C. (68° F.)/min to attain a final temperature of 200° C. (392° F.) to 220° C. (428° F.). The thermal output during this heating cycle is recorded as the area under the melting peak of the sample and is measured in Joules as a measure of the heat of fusion. The melting temperature is recorded as the temperature of the greatest heat absorption within the range of melting of the sample.

In some embodiments, the thermoplastic resin has MFR of 20 g/10 min or less, 15 g/10 min or less, more preferably 10 or less, 5 or less, 3 or less, or even 1 or less, in some embodiments (measured per ASTM D1238, at 230° C. (446° F.) and 2.16 kg mass). For instance, MFR of the thermoplastic resin may be within the range from a low of any one of 0.01, 0.1, and 0.5 g/10 min to a high of any one of 1, 3, 5, 10, 15, 16 or 20 g/10 min (ASTM D1238, 230° C. (446° F.) and 2.16 kg). In certain of these embodiments, the thermoplastic component comprises only thermoplastic resin with MFR according to the foregoing description.

In yet other embodiments the TPV composition (and/or the TPV formulation) may comprise two or more thermoplastic resins, which can be two or more polypropylene resins. In particular, the TPV composition may comprise (i) a low-MFR thermoplastic resin having MFR of 15 g/10 min or less (or other MFR per the above description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. The low-MFR thermoplastic resin is used to provide viscosity matching during TPV manufacturing for finer vulcanized rubber dispersions whereas the high-MFR thermoplastic resin is employed to provide TPV processability for injection molding and other fabrication techniques that require lower TPV viscosity. For instance, of the combined weight of the low-MFR and high-MFR thermoplastic resin, 51 to 99 wt % is low-MFR, such as 55 to 95 wt %, or 55 wt % to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

In the presently disclosed compositions and methods, the thermoplastic resin is an olefinic thermoplastic resin that comprises, or consists of, polypropylene. In preferred embodiments, the thermoplastic component comprises, in some embodiments consists of, an isotactic polypropylene.

Amount of Thermoplastic Component:

In many embodiments, the thermoplastic component of a TPV composition and/or TPV formulation makes up from 10 to 40 wt % of the TPV composition and/or TPV formulation, based on the total weight of the TPV formulation, including both of extender and processing oils. Other contemplated ranges include 15 to 30 wt % and 17 to 25 wt %, with ranges from any of the foregoing low ends to any of the foregoing highs ends also contemplated in various embodiments.

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha-olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., an API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from Chevron-Texaco Corp.). Also or instead, the oil could include white oil (e.g., pharmaceutical grade oil, such as Primol™ 542 high purity grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation in amounts within the range from 10 to 70 wt %, preferably 20 to 60 wt %, such as 40 to 60 wt %, such weight percentages based on total weight of the TPV formulation, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation), with ranges from any of the foregoing lows to any of the foregoing highs also contemplated.

Total additive oil (extender oil+process oil) may therefore be within the range from 5 to 350 phr (or 5 to 70 wt %) based on total weight of TPV formulation.

Cure Agents

The TPV formulation also includes a vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046] to [0054] of PCT Application No. PCT/US2015/65048, filed Dec. 10, 2015, which description is hereby incorporated by reference. "Curatives" encompasses both vulcanizing agents and curing accelerators.

Curative compositions as described above are typically added to a TPV formulation in an amount of from 0.015 to 0.03 wt % of the TPV formulation, for example from 0.02 to 0.03 or from 0.02 to 0.025 wt %.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

Preparing TPV Compositions

As those skilled in the art appreciate, dynamic vulcanization includes a process whereby a rubber that is undergoing mixing with a thermoplastic resin is cured (i.e., crosslinked, or vulcanized). The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a reactor, such as an extruder, melt-mixer, or other reactive mixing device (for example, a Banbury mixer or a Brabender mixer). An intermeshing twin-screw extruder is a preferred mixer. Furthermore, not all components of the TPV formulation need necessarily be introduced to the reactor at the same time. See, for example, U.S. Patent Publication 20170292016, hereby incorporated by reference in its entirety and for all purposes, which discloses addition of colorant and other additives both during and after the dynamic vulcanization process, as well as a "masterbatch" method of adding either or both of a curative formulation and a formulation of additional additives.

For instance, dynamic vulcanization can be performed as follows: The rubber component and thermoplastic component are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend or "melt". The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative (e.g. as a resin-in-oil or "RIO" composition), or after dynamic vulcanization—or at any two or more of the foregoing points in the process. Processing oils are necessary for cooling the extruder to prevent viscous over-heating and to lower the viscosity in order to avoid extruder overtorque.

Methods according to particular embodiments include "preloading" process oil, meaning that a portion of the process oil is introduced to the TPV formulation before the curative is introduced. Surprisingly, it has been found that some degree of oil preloading may result in increased tensile properties of the resulting TPV, without increasing hardness, which may be desired in some foaming applications.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These weight percentage values are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of embodiments of the present disclosure is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

In the present disclosure, the thermoplastic component added to a formulation processed to prepare a TPV can be an isotactic polypropylene (iPP); and the rubber component added to the TPV formulation can be a PEDM terpolymer; such a TPV formulation can further include one or more diluents. A "diluent" is a non-reactive, non-curing component such as a mineral oil, naphthenic oil, linear or branched olefin oil, or some combination thereof. During mixing of such a TPV formulation, another portion of a diluent may be added (which may be the same or different from one included in the TPV formulation before such addition) and the mixing continued. Then one or more curatives or curative composition can be added, thus beginning the vulcanizing reactions and providing a reacting TPV formulation, and the mixing continued. A further portion of a diluent can be added and the mixing continued until the reacting is completed to a desired degree, providing a TPV composition, and then the TPV composition is recovered, for example by pressing the composition through an extrusion die at an appropriate temperature.

In some implementations of such a method as above, the isotactic polypropylene (iPP) can added in an amount from 20 to 30 wt % of the TPV formulation; the total amount of diluent added can be from 10 to 30 wt % of the TPV formulation, and the propylene-ethylene-diene terpolymer (PEDM) can be added in an amount from 35 to 70 wt % of the TPV formulation.

In some instances of such a method as above, the curative can be added as a resin-in-oil composition (such as a phenolic resin curative in oil), stannous chloride and zinc oxide. In such instances, typically the resin-in-oil composition is added to the mixing TPV formulation, and then after some further mixing, the stannous chloride and zinc oxide are added. The resin-in-oil composition can be added to a mixer in which the TPV formulation is reacting from a different physical location on the mixer from the position at which the zinc oxide and stannous chloride are added.

In some instances of a method as disclosed above, the mixing (and reacting, after the curative(s) are added) can be performed at a temperature of from 150 to 200° C. in a batch internal mixer, which can for example be a Brabender or Banbury mixer, running at from 80 to 120 rpm, and the mixing can be continued for about 1 minute between the step of mixing the iPP, the PEDM and first portion of diluent and the step of adding the second portion of diluent, and the mixing can be continued for about 2 minutes between the addition of the second portion of diluent and adding the curative(s), and the mixing can be continued for about 5 minutes between adding the curative(s) and the step of adding the third portion of diluent, and the mixing can then be continued for about 3 minutes before recovering the TPV composition.

Some instances of a method performed as disclosed above are performed at a temperature from 200 to 250° C. in a continuous twin-screw extruder running at from 50 to 200 RPM with 1 to 5 minutes of residence time of the TPV formulation. In some such implementations, the different components of the TPV formulation can be added from two or more different positions about the mixer. For example, the iPP and PEDM components, with a first part of diluent, might be added at a first position along the flow of a continuous intermeshing twin-screw extruder, and the second portion of diluent and the curative(s) might be added from a second position downstream from the first position.

Figure 2:
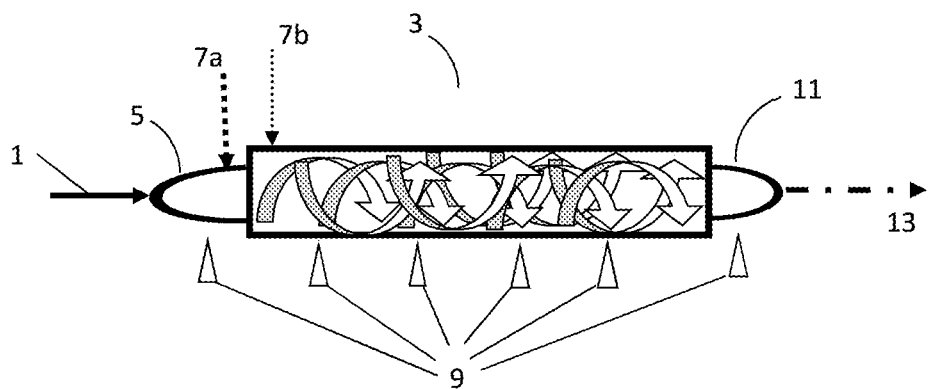
FIG. 2 illustrates schematically one embodiment of a process as disclosed herein and an associated apparatus.

Referring now to FIG. 2, a schematic illustration of one embodiment of a process and associated apparatus according to the present disclosure, a feed 1 comprising one or more of a polypropylene, e.g., iPP, a rubber component, e.g., PEDM terpolymer and optional processing oil, is introduced to an internal mixer 3, e.g., an intermeshing twin-screw extruder, via an inlet 5 that is configured to receive the selected ingredients. The mixer is further configured with additional inlets for feeds for additional ingredients 7a, 7b, of the TPV formulation, e.g., one or more of a curative or another additive such as a filler. The mixer is further configured with one or more temperature controllers or heaters 9, configured to raise the temperature of the TPV composition to at least the Tm of the TPV composition and maintain the temperature of the TPV composition within the mixer, including at the inlet, along the length of the mixer and at the outlet 11, at a desired temperature between Tm and the degradation temperature of the TPV composition. The temperature need not be the same from the inlet along the length of the mixer and at the outlet, but can be varied along this path as desired. The melted TPV composition is mixed and reacted to form the thermoplastic vulcanizate and then fed via an outlet 11 to provide a TPV extrudate stream 13 that can be fed, for example, to a pelletizer (not shown) to be cooled and pelleted, or to any other desired downstream process. The outlet 11 can be configured with an extrusion die to shape the extrudate in some fashion if that is desired. The temperature of the outlet 11 is maintained at a desired temperature for extrusion or process for the recovery of the TPV composition by the temperature controller 9 configured to maintain the temperature of the TPV composition at the outlet.

Figure 3:
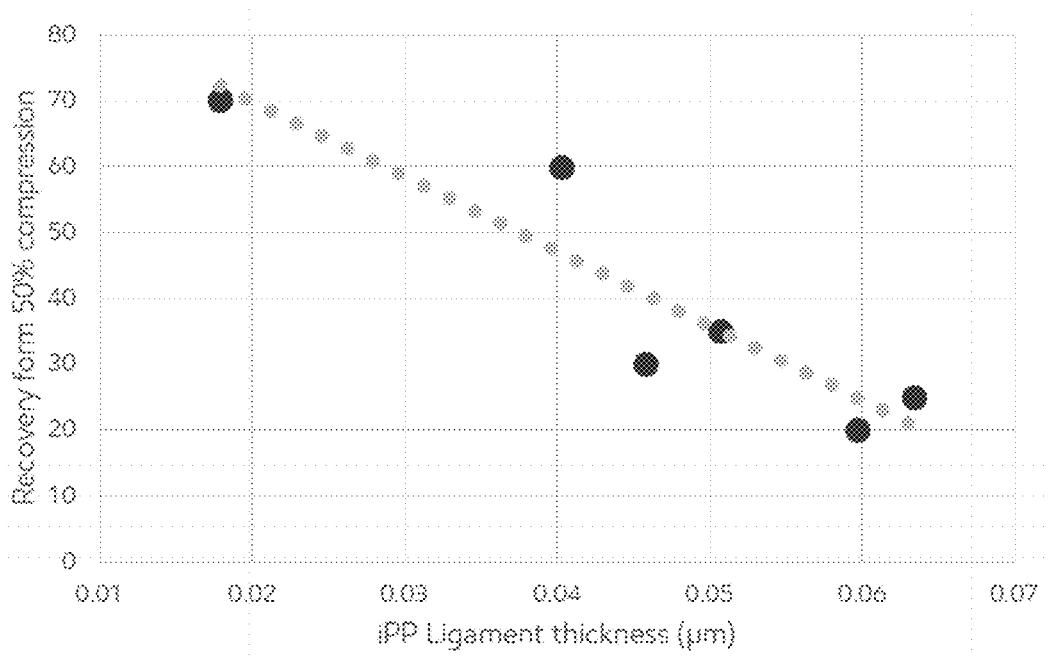
FIG. 3 Correlation of elastic recovery to particle size dispersion in EPDM/iPP TPV.
Figure 4A:
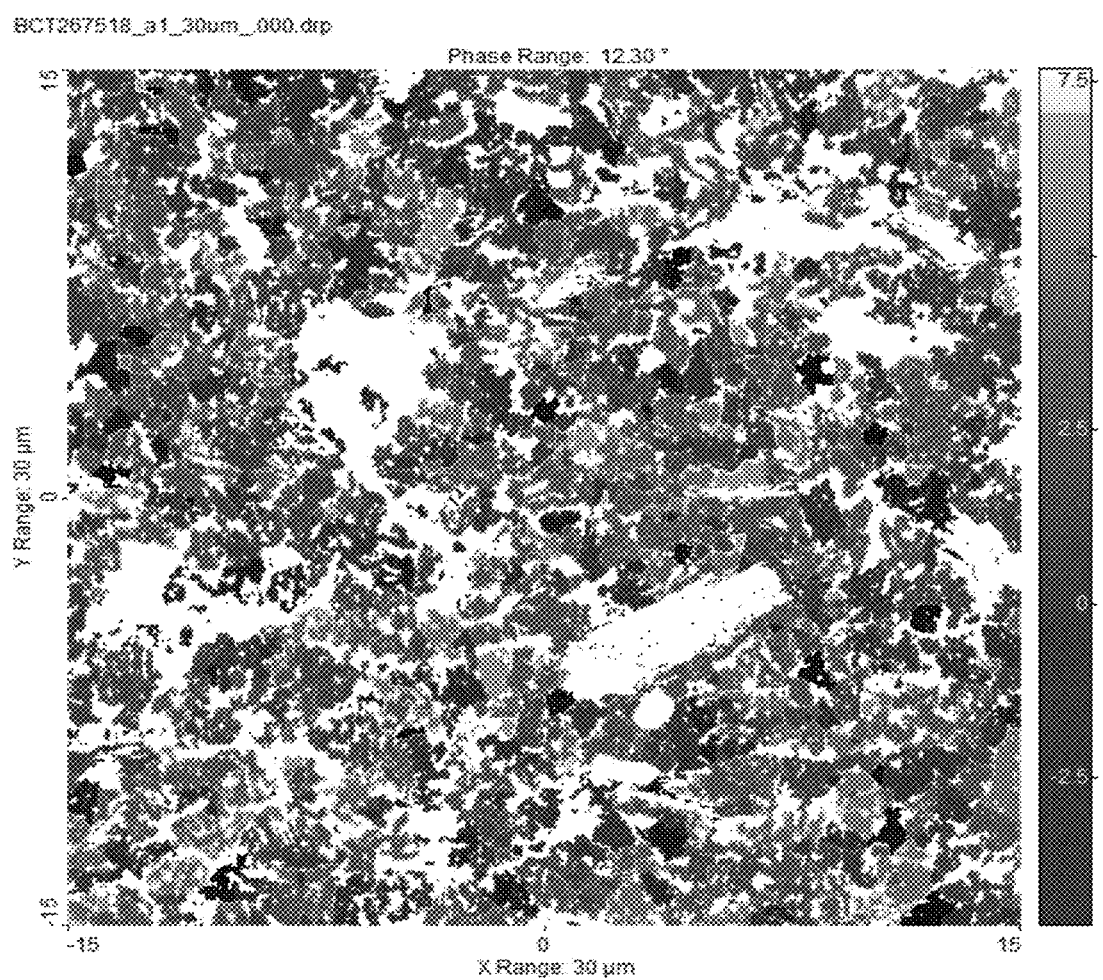
FIGS. 4A-4C show PEDM rubber dispersions in example TPV compositions: 4A contains 16 wt % ethylene PEDM; 4B contains 23 wt % ethylene PEDM; and 4C contains 35 wt % ethylene PEDM.
Figure 4B:
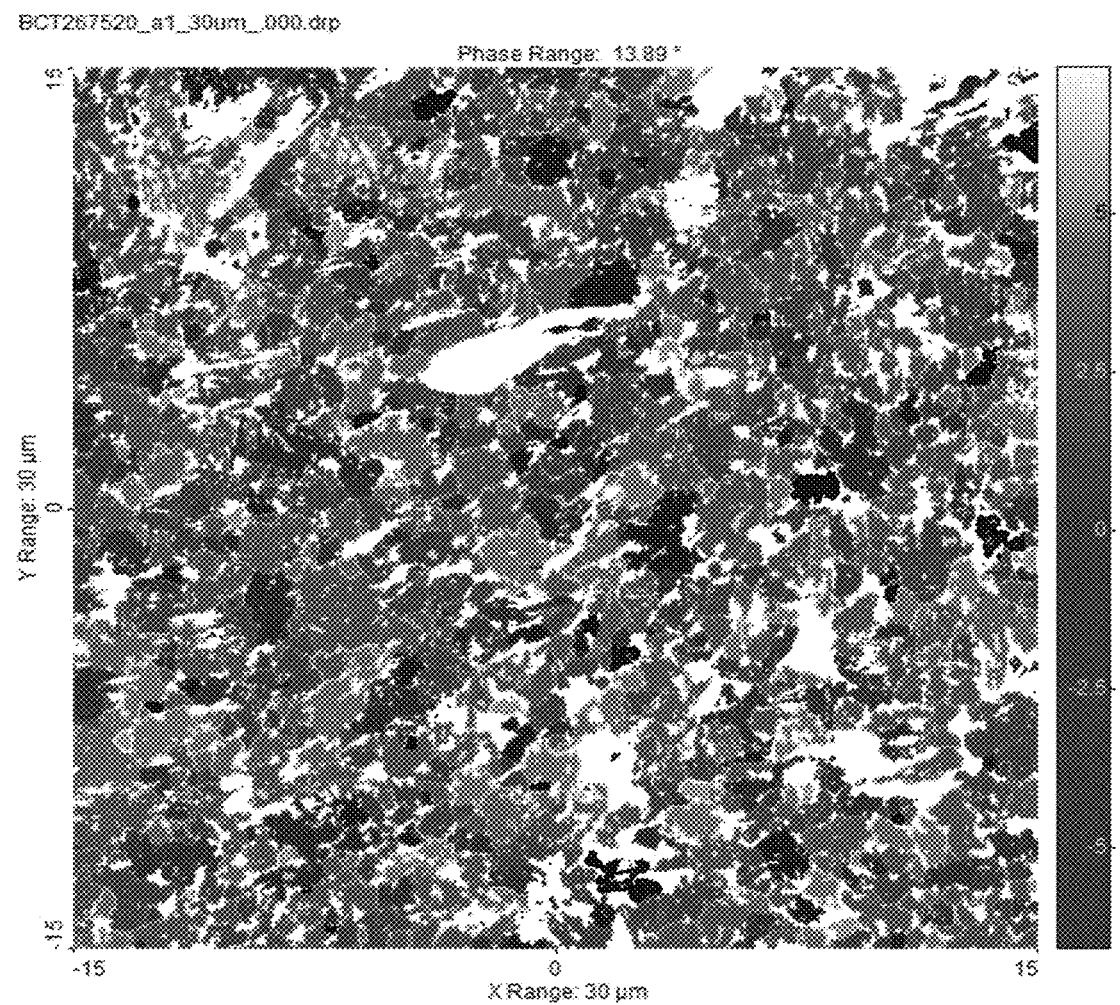
Figure 4C:
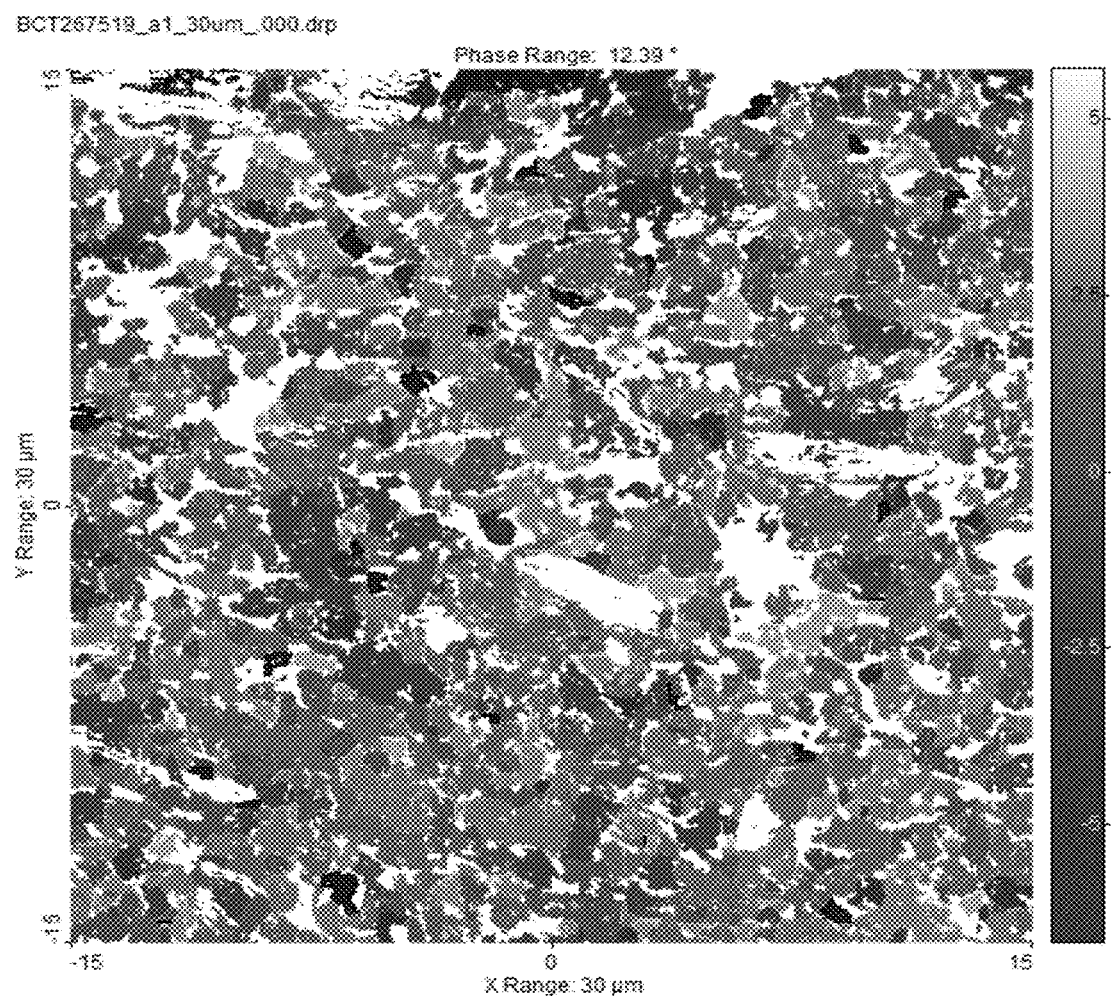
Figure 5A:
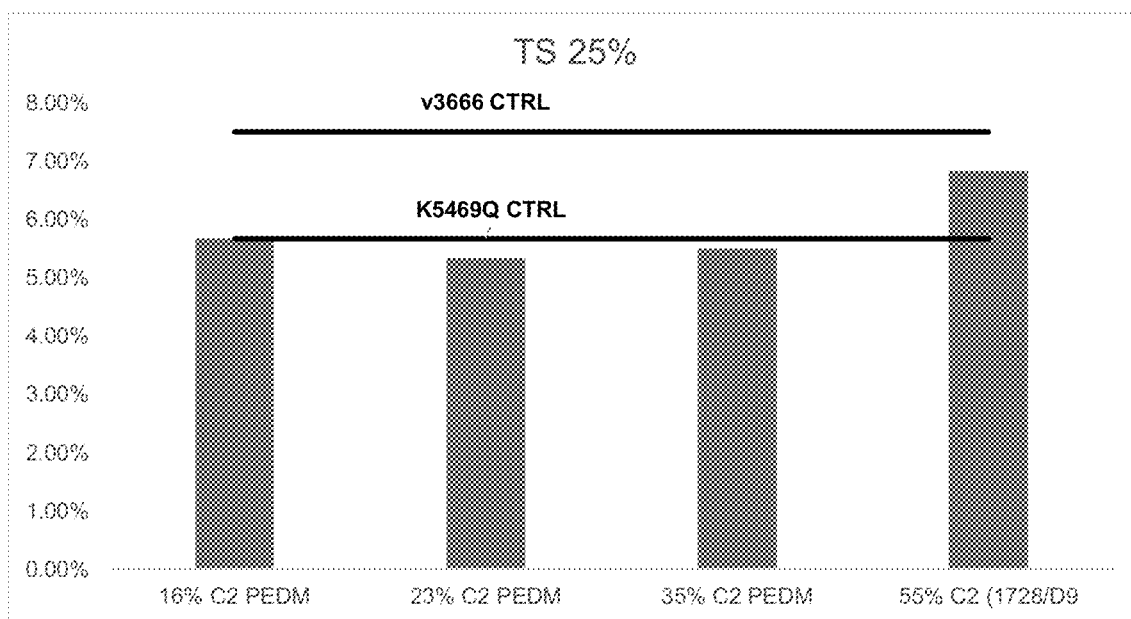
FIGS. 5A-5B show a graph of tension set for 25% and 50% elongation versus ethylene content in the PEDM for selected inventive samples, respectively.
Figure 5B:
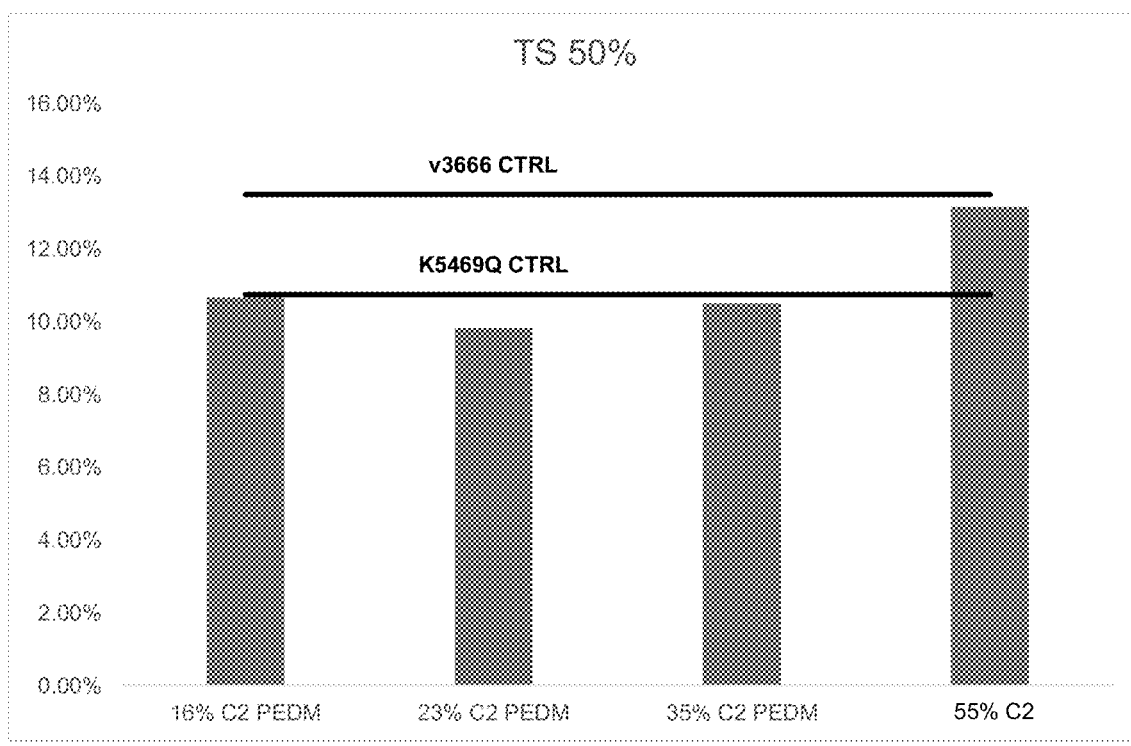
Figure 6A:
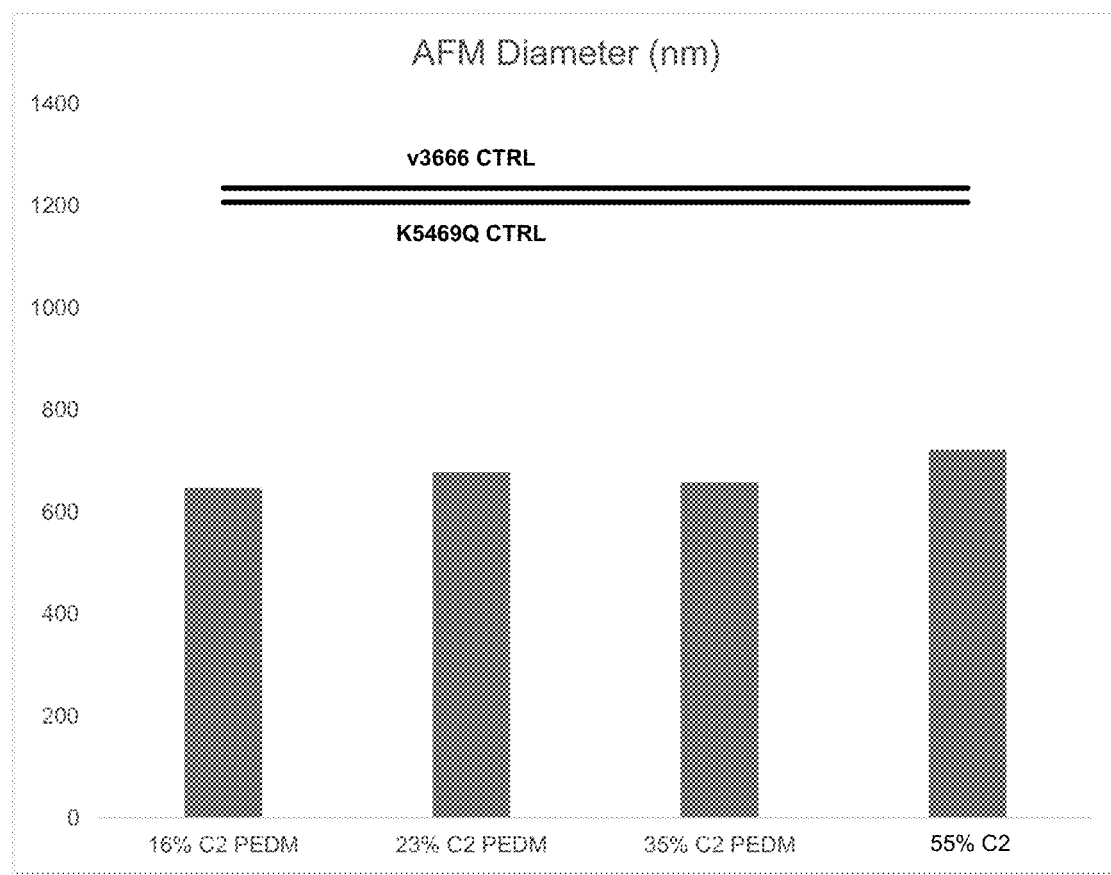
FIGS. 6A-6B show graph of particle diameter of the rubber particles and the dispersity in the particle size versus ethylene content in the PEDM for selected inventive samples, respectively.
Figure 6B:
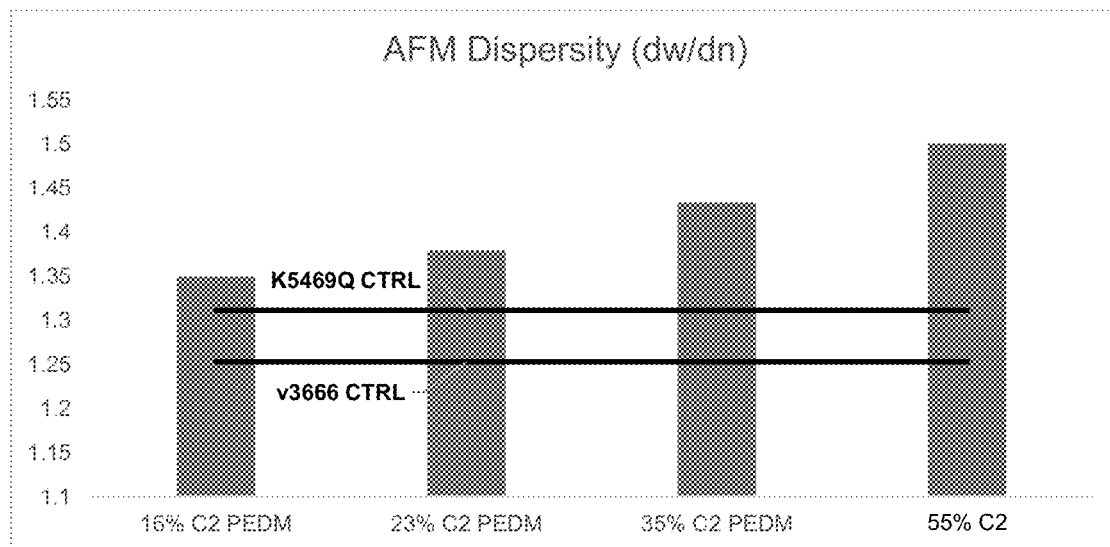
Figure 7A:
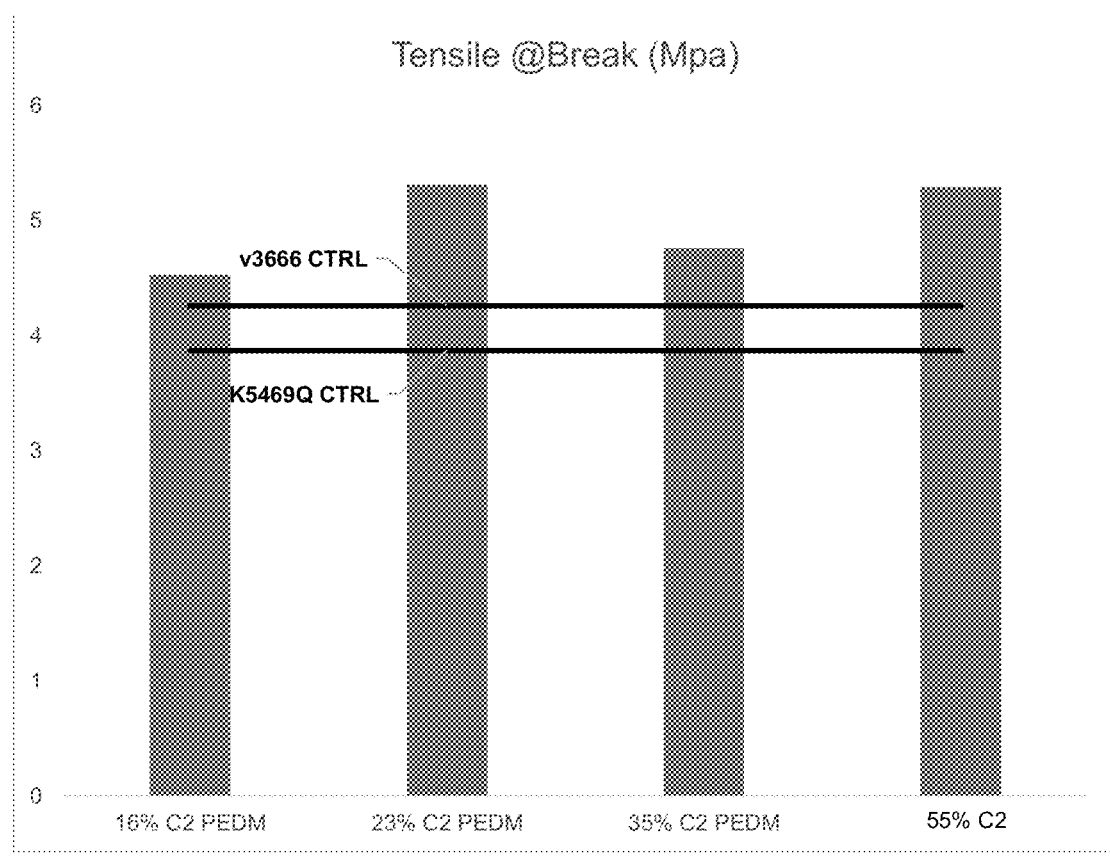
FIGS. 7A-7B show a graph of tensile strength and the elongation of the TPV versus ethylene content in the PEDM for selected inventive samples, respectively.
Figure 7B:
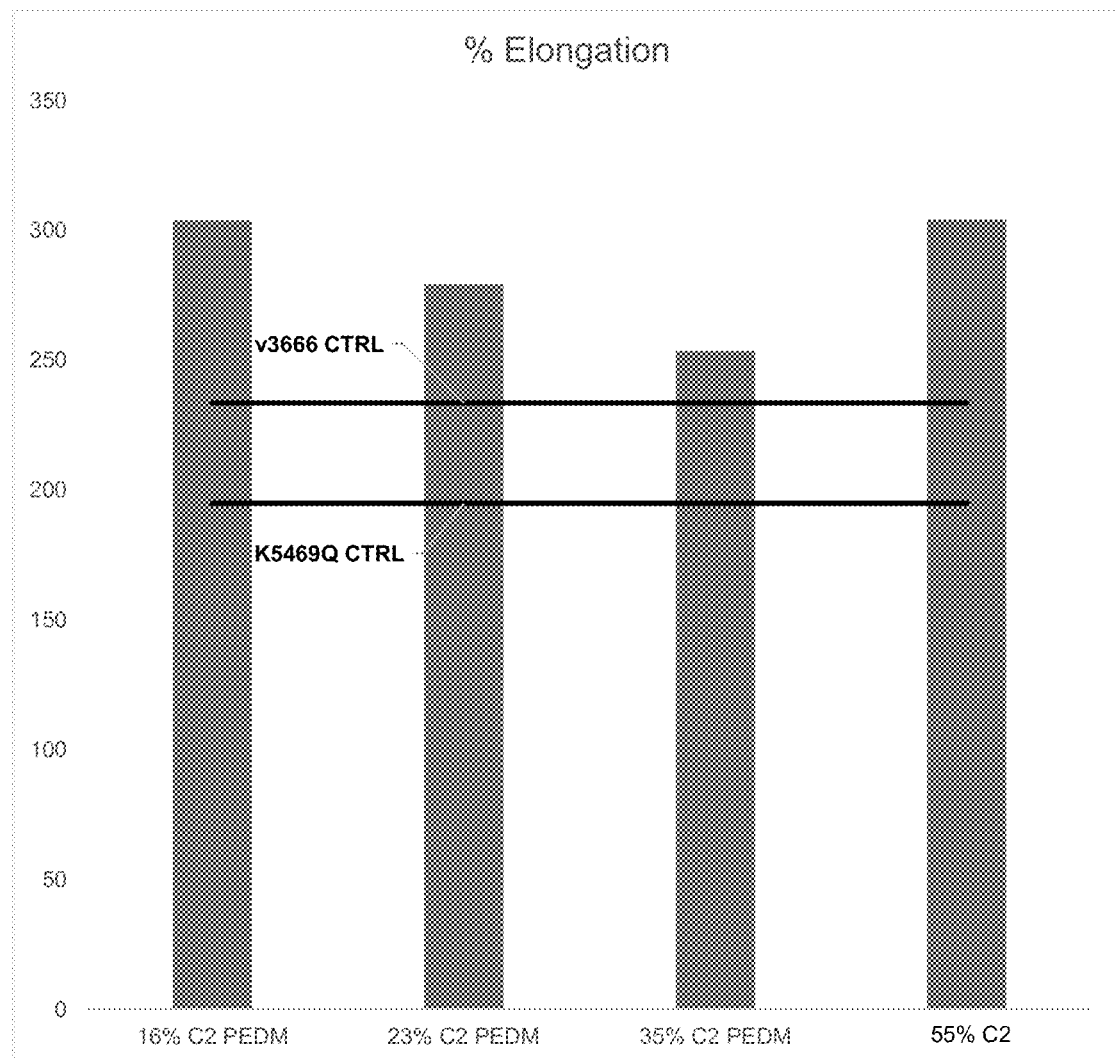

Referring now to FIG. 3, a process flow diagram for one embodiment of a method according to the present disclosure, at arrows 21, the basic ingredients of a TPV formulation (rubber component "a", thermoplastic component "b", oil "c", are introduced into a mixer and mixed to form a TPV formulation (i.e., an unvulcanized TPV composition) 23, which is subjected to further mixing at step 25 for a period of time. One or more curatives, or a curative composition comprising a vulcanizing agent and one or more curing accelerators "d" are mixed with the TPV formulation to form a reacting TPV formulation 27, which is subjected to further mixing 29. Further processing oil "e" is added to the partially or completely vulcanized composition 31 and mixing is continued to form a final TPV composition 35, which is then recovered and optionally can be further processed 37, e.g. by cooling and pelleting, or extrusion to form a slab or other shape 39.

EMBODIMENTS

Embodiment 1: A thermoplastic vulcanizate comprising a polypropylene matrix phase in which cross-linked rubber particles are dispersed, the thermoplastic vulcanizate comprising the reaction product of a mixture comprising:
  (a) at least 10 wt % of isotactic polypropylene;
  (b) at least 30 wt % of a propylene-ethylene-diene terpolymer (PEDM) containing at least 60 wt % propylene-derived units and less than or equal to 25 wt % of ethylene-derived units wherein the PEDM is amorphous;
  (c) at least 0.015 wt % of at least one curative; and
  wherein the mixture is formed without adding an ethylene-propylene-diene terpolymer (EPDM), and the percentages of components (a) to (c) are based on the total weight of the mixture Embodiment 2. The thermoplastic vulcanizate further comprising at least 10 wt % of a diluent.

Embodiment 3. The thermoplastic vulcanizate of embodiment 1 or 2, wherein the PEDM comprises 5 to 18 wt % of ethylene-derived units.

Embodiment 4. The thermoplastic vulcanizate of embodiment 1 or 2, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

Embodiment 5. The thermoplastic vulcanizate of any one of embodiments 1 to 3, wherein the PEDM has a viscosity from 10 to 90 MST (5+4) at 230° C.

Embodiment 6. The thermoplastic vulcanizate of any one of embodiments 1 to 4, in which the amount of PEDM is from 35 to 70 wt % of the mixture, preferably from 40 to 60 wt % of the mixture.

Embodiment 7. The thermoplastic vulcanizate of any one of embodiments 1 to 6, wherein the particle size dispersity index (PSDI) of the rubber particles is less than 3.

Embodiment 8. The thermoplastic vulcanizate of any one of embodiments 1 to 7, wherein the PEDM has a heat of fusion (Hf) which is less than or equal to 1 J/g.

Embodiment 9. The thermoplastic vulcanizate of any one of embodiments 1 to 8, wherein the PEDM has a heat of fusion (Hf) which is undetectable.

Embodiment 10: A thermoplastic vulcanizate comprising an isotactic polypropylene matrix phase in which cross-linked rubber particles are dispersed, the thermoplastic vulcanizate comprising the reaction product of a mixture comprising:
  (a) 20 to 30 wt % of isotactic polypropylene (iPP);
  (b) 35 to 70 wt % of a propylene-ethylene-diene terpolymer (PEDM) containing at least 60 wt % propylene-derived units and less than or equal to 25 wt % of ethylene-derived units, wherein the PEDM is amorphous;
  (c) at least 10 to 30 wt % of a diluent;
  (d) 0 to less than 30 wt % of an ethylene-propylene-diene terpolymer (EPDM) containing at least 50 wt % of ethylene-derived units; and
  (e) 0.5 to 5.0 wt % of at least one curative;
  wherein the percentages of components (a) to (e) are based on the total weight of the mixture.

Embodiment 11. The thermoplastic vulcanizate of embodiment 10, wherein the PEDM comprises 5 to 18 wt % of ethylene-derived units.

Embodiment 12. The thermoplastic vulcanizate of embodiment 10 or 11, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

Embodiment 13. The thermoplastic vulcanizate of any one of embodiments 10 to 12, wherein the PEDM has a viscosity from 10 to 90 MST (5+4) at 230° C.

Embodiment 14. The thermoplastic vulcanizate of any one of embodiments 10 to 13 in which the amount of PEDM is from 40 to 60 wt % of the mixture.

Embodiment 15. The thermoplastic vulcanizate of any one of embodiments 10 to 14, wherein the particle size dispersity index (PSDI) of the rubber particles is less than 3.

Embodiment 16. The thermoplastic vulcanizate of any one of embodiments 10 to 15, wherein the PEDM has a heat of fusion (Hf) which is undetectable.

Embodiment 17. The thermoplastic vulcanizate of any one of embodiments 10 to 16, wherein the PEDM has a heat of fusion (Hf) which is undetectable.

Embodiment 18. The thermoplastic vulcanizate of any one of embodiments 10 to 17, further comprising up to 20 wt % of an ethylene-propylene-diene terpolymer (EPDM) containing at least 50 wt % of ethylene-derived units.

Embodiment 19: A process for producing a thermoplastic vulcanizate (TPV) comprising:
  i) providing a mixture comprising:
    (a) at least 10 wt % of isotactic polypropylene;
    (b) at least 30 wt % of a propylene-ethylene-diene terpolymer (PEDM) containing at least 60 wt % propylene-derived units and less than or equal to 25 wt % of ethylene-derived units, where the PEDM is amorphous;
    (c) optionally, at least 10 to 30 wt % of a diluent;
    (d) at least 0.015 wt % of at least one curative;
    wherein the mixture is provided without an ethylene-propylene-diene terpolymer (EPDM), and the percentages of components (a) to (d) are based on the total weight of the mixture; and
  (ii) reacting the mixture under shear and at a temperature above the melting point of the polypropylene to at least partially cross-link the PEDM and produce a polypropylene matrix phase in which cross-linked rubber particles are dispersed.

Embodiment 20: A process for producing a thermoplastic vulcanizate (TPV) comprising:
  i) providing a mixture comprising:
    (a) 20 to 30 wt % of isotactic polypropylene (iPP);
    (b) 35 to 70 wt % of a propylene-ethylene-diene terpolymer (PEDM) containing at least 60 wt % propylene-derived units and less than or equal to 25 wt % of ethylene-derived units, wherein the PEDM is amorphous;
    (c) optionally, 10 to 30 wt % of a diluent;
    (d) optionally, 0 to less than 30 wt % of an ethylene-propylene-diene terpolymer (EPDM) containing at least 50 wt % of ethylene-derived units;
    (e) 0.5 to 5.0 wt % of at least one curative;
    wherein the percentages of components (a) to (e) are based on the total weight of the mixture; and
  (ii) reacting the mixture under shear and at a temperature above the melting point of the polypropylene to at least partially cross-link the PEDM and produce a polypropylene matrix phase in which cross-linked rubber particles are dispersed.

Embodiment 21. The process of embodiment 19 or 20, wherein the step of reacting (ii) is performed in a twin-screw extruder.

Embodiment 22. The process of embodiment 19 or 20, wherein the amount of PEDM is from 35 to 70 wt % of the mixture, preferably from 40 to 60 wt % of the mixture.

Embodiment 23. The process of any one of embodiments 19 to 22, wherein the particle size dispersity index (PSDI) of the rubber particles is less than 3.

Embodiment 24. The process of any one of embodiments 19 to 23, wherein the PEDM has a heat of fusion (Hf) which is undetectable.

Embodiment 25. The process of any one of embodiments 19 to 24, wherein the PEDM has a heat of fusion (Hf) which is undetectable.

Embodiment 26. The process of any one of embodiments 19 to 25, wherein the PEDM comprises 5 to 18 wt % of ethylene-derived units Embodiment 27. The process of any one of embodiments 19 to 26, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

Embodiment 28. The process of any one of embodiments 19 to 27, wherein the PEDM has a viscosity from 10 to 90 MST (5+4) at 230° C.

Embodiment 29. The thermoplastic vulcanizate of any one of embodiments 1 to 18 or the process of any one of embodiments 19 to 27, wherein, the TPV has an elongation at break of 200% or more, alternately 225% or more, alternately 250% or more.

Embodiment 30. The thermoplastic vulcanizate of any one of embodiments 1 to 18 or the process of any one of embodiments 19 to 27, wherein, the TPV has a break stress of 3 MPa or more, alternately 4 MPa or more, alternately 5 MPa or more.

Embodiment 31. The thermoplastic vulcanizate of any one of embodiments 1 to 18 or the process of any one of embodiments 19 to 27, wherein, the TPV has a tension set from 25% elongation of 7% or less, alternately 6% or less, alternately 5% or less.

Embodiment 32. The thermoplastic vulcanizate of any one of embodiments 1 to 18 or the process of any one of embodiments 19 to 27, wherein, the TPV has a tension set from 50% elongation of 14% or less, alternately 12% or less, alternately 10% or less.

Embodiment 33. The thermoplastic vulcanizate of any one of embodiments 1 to 18 or the process of any one of embodiments 19 to 27, wherein, the TPV has an number average particle size diameter of the rubber particles (PEDM, and EPDM if present) of 800 nm or less, alternately 700 nm or less, alternately 600 nm or less.

Embodiment 34. The thermoplastic vulcanizate of any one of embodiments 1 to 18 or the process of any one of embodiments 19 to 27, wherein the TPV has an dispersity of crosslinked particle size diameter of the rubber particles (PEDM, and EPDM if present) of 1.6 or less, alternately 1.5 or less, alternately 1.4 or less, or 1.35 or less.

Embodiment 35. The thermoplastic vulcanizate of any one of embodiments 1 to 18 or the process of any one of embodiments 19 to 27, wherein the TPV has:

Embodiment 36. The thermoplastic vulcanizate of any one of embodiments 1 to 18 or the process of any one of embodiments 19 to 35, wherein the TPV has:
1) an elongation at break of 200% or more, alternately 225% or more, alternately 250% or more;
2) a break stress of 3 MPa or more, alternately 4 MPa or more, alternately 5 MPa or more;
3) a tension set from 25% elongation of 7% or less, alternately 6% or less, alternately 5% or less;
4) a tension set from 50% elongation of 14% or less, alternately 12% or less, alternately 10% or less;
5) an number average particle size diameter of the rubber particles (PEDM, and EPDM if present) of 800 nm or less, alternately 700 nm or less, alternately 600 nm or less; and
6) a dispersity of crosslinked particle size diameter of the rubber particles (PEDM, and EPDM if present) of 1.6 or less, alternately 1.5 or less, alternately 1.4 or less, or 1.35 or less.

Embodiment 37. The thermoplastic vulcanizate of any one of embodiments 1 to 18 or the process of any one of embodiments 19 to 36, wherein the TPV has a Dw/Dn of 7 or less.

Embodiment 38. The thermoplastic vulcanizate of any one of embodiments 1 to 18 or the process of any one of embodiments 19 to 35, wherein the TPV has: a tension set at 50% elongation of 14% or less and a Dw/Dn of 7 or less.

EXPERIMENTAL

Z-average (Mz), weight-average (Mw), number average molecular weights (Mn), viscosity average (Mv) molecular weights and the molecular weight of the highest peak (Mp) can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M (Mw, Mn, Mz) can be computed from known expressions. The desired MWD function (e.g., Mw/Mn or Mz/Mw) is the ratio of the corresponding M values. Measurement of M and MWD are well known in the art and are discussed in more detail in, for example, Slade, P. E. Ed., Polymer Molecular Weights Part II, Marcel Dekker, Inc., NY, (1975) 287-368; Rodriguez, F., Principles of Polymer Systems 3rd Ed., Hemisphere Pub. Corp., NY, (1989) 155-160; U.S. Pat. No. 4,540,753; Ver Strate et al., Macromolecules, Vol. 21, (1988) pp. 3360-3371, each of which is incorporated herein by reference.

All TPV samples, including control examples, were cryo-faced using a cryo-microtom (Leica) and examined afterward by a tapping phase AFM (atomic force microscopy, Icon, Bruker). For each sample, three 60 by 60 micron phase images were collected and then processed by SPIP software (scanning probe image processing, Image Metrology). Image processing results of all examples are tabulated in Tables below along with their mechanical properties. Particle count is the number of dispersion particles measured in images and Dn, Dw, and Dv are equivalent dispersion diameters of number average, weight average, and volume average respectively. Dw/Dn is the "particle size dispersity index", or PSDI, and is a measure of the size dispersity. The area percent is the percentage of area occupied by these vulcanized rubber particles.

Mooney viscosity: Mooney Small Thin viscosity (MST) (5+4) at 230° C. and Mooney Small Thin relaxation area (MSTRA) are determined using ASTM D1646.

All TPV samples were compression molded into test specimens for mechanical measurements.

Flexural modulus was determined according to ASTM D-790 ProA, at 0.05 in/min deformation rate, in MPa.

Hysteresis values were determined by the energy loss, in J, during tensile extensions to 200% in 2 cycles at 200 mm/min. The $1^{st}$ hysteresis is for the $1^{st}$ cycle of loading and unloading and $2^{nd}$ hysteresis is for the $2^{nd}$ cycle of loading and unloading. Hysteresis values are determined using the method described at U.S. Pat. No. 9,938,400, Column 31, line 63 to column 32, line 44.

Tension set was determined according to ASTM D-412 Method A using a dumbbell shaped die cut sample at room temperature. 25% and 50% extension of the sample was used with the elongation and relaxation times as specified with elongation speed of 50 mm/min being used.

Tensile strength, % strain and strain property values were obtained from samples tested according to ASTM D638, except that the separation of the grips (30 mm grip) was conducted at 50.8 cm/min (20 in/min). The extension of the grips and thus the samples was independently determined using an extensometer attached to the testing apparatus. The tensile strength data were reported in engineering units (MPa or psi), and the elongation was reported as the % elongation of the distension zone of the sample.

Dynamic Mechanical Thermal Analysis (DMTA): Dynamic mechanical thermal analysis (DMTA). This test provides information about the small-strain mechanical response (relaxation behavior) of a sample as a function of temperature over a temperature range that includes the glass transition region and the visco-elastic region prior to melting.

Typically, samples were tested using a three point bending configuration (TA Instruments DMA 2980). A solid rectangular compression molded bar was placed on two fixed supports; a movable clamp applied a periodic deformation to the sample midpoint at a frequency of 1 Hz and amplitude of 20 µm. The sample was initially cooled to −130° C. then heated to 60° C. at a heating rate of 3° C./min. In some cases, compression molded bars were tested using other deformation configurations, namely dual cantilever bending and tensile elongation (Rheometrics RSAII). The periodic deformation under these configurations was applied at a frequency of 1 Hz and strain amplitude of 0.05%. The sample was cooled to −130° C. and then heated to 60° C. at a rate of 2° C./min. The slightly difference in heating rate does not influence the glass transition temperature measurements significantly.

Shore A Hardness: The determination of the Shore A hardness is according to ASTM D 2240. In this version of the method a portion of the sample is tested at room temperature. The data is recorded 15 seconds after the indentation is created in the sample.

MFR was determined according to ASTM D 1238 (2.16 kg, 230° C.).

Materials:
Resin-in-oil, RIO, curative composition is 30/70 resin/oil composition containing paraffinic oil and a phenolic resin (SP1045™ phenolic (octylphenol-formaldehyde resin with methylol active group), or HRJ16261™ phenolic resin, both obtained from Schnedtady Chemical Inc., SI Group).

PP5341™—isotactic polypropylene, iPP, having a melt flow rate, MFR, of 0.8 dg/min, available from ExxonMobil Chemical Company.

Irganox™ 1076—hindered phenolic antioxidant available from Ciba-Geigy.

Irgafos™ 168—phosphite antioxidant available from Ciba-Geigy.

AMP™ 49974—carbon black masterbatch, obtained from Ampecet Corporation.

IcecapK™—clay available from Burgess Pigment Company.

Paralux™ 6001R—water white paraffinic process oil available from Chevron Texaco.

ParaMount™ 6001R—paraffinic process oil available from Chevron Texaco.

Sunpar™ 150—paraffinic oil available from R.E. Carroll, Inc.

Vistalon™ 3666 EPDM,—oil extended (75 phr) ethylene propylene diene monomer rubber having 65 wt % ethylene, 4.5% ENB, and having a 52 Mooney, available from ExxonMobil Chemical Company.

Keltan™ 597Q—EPDM oil extended (100 phr oil) EPDM having 62% ethylene, 4.0% ENB, 55 Mooney, available from Arlanxeo Company.

The following examples are presented for illustrative purposes and not intended to limit the scope of the present disclosure.

EXAMPLES

The following examples are presented for illustrative purposes and not intended to limit the scope of the present disclosure.

PEDM Synthesis for Formulation One

PEDMs were produced using a solution process in a 0.5-liter continuous stirred-tank reactor (autoclave reactor). The autoclave reactor was equipped with a stirrer, a water-cooling/steam-heating element with a temperature controller, and a pressure controller. Solvents and monomers were first purified by passing through a three-column purification system. The purification system consisted of an Oxiclear column (Model #RGP-R1-500 from Labclear) followed by a 5A and a 3A molecular sieve column. Purification columns were regenerated periodically whenever there was evidence of low catalyst activity. Isohexane was used as a solvent. Solvent was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to a reactant inlet manifold. A mixture of isohexane and tri-n-octylaluminum (TNOAL) and ethylene norbornene (ENB) was also added to the reactant inlet manifold through a separate line and the combined mixture of monomers and solvent was fed into the reactor using a single tube. Tri-n-octylaluminum (TNOAL, available from Sigma Aldrich, Milwaukee, Wis.) solution was diluted to a concentration of $1.843 \times 10^{-6}$ using isohexane.

Isohexane and TNOAL solutions were fed using Pulsa pumps and their flow rate was controlled using a pump calibration curve. Purified propylene, and ENB were also fed using Pulsa pumps but their flow rate was controlled using mass-flow controllers. The feed rate of purified ethylene was also regulated using a mass flow controller. Ethylene and propylene combined into a single line before entering a manifold upstream of the reactor. Isohexane, TNOAL solution, and ENB solution lines also combined in a single line before entering the same manifold. The resulting two lines merged further downstream and the combined mixture of monomers and solvent was fed into the reactor using a single tube.

Catalyst used in these examples was bis(p-triethylsilylphenyl)carbyl(cyclopentadienyl)(2,7-di-t-butylfluorenyl-hafniumdimethyl and the activator used was dimethylaniliniumtetrakis(heptafluoronaphthyl)borate. The catalyst/activator solution was prepared daily and used on the same day. The solution was prepared by dissolving 80 mg of the catalyst and 99.1 mg of the activator in 450 ml toluene (catalyst concentration=$1.884 \times 10^{-07}$ mol/ml, catalyst/activator (molar ratio)=0.98). This solution was pumped into the reactor through a designated dip-tube at a desired rate using an Isco pump.

Composition was controlled by adjusting the feed ratio of the monomers while the molecular weight of the polymer, under fixed feed conditions, was controlled using temperature. The collected samples were first placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. The ethylene and ENB content of the polymer was determined by Fourier-transform infrared spectroscopy (FTIR). The monomer conversions were calculated using the polymer yield, composition and the amount of monomers fed into the reactor. Catalyst activity (also referred as to catalyst productivity) was calculated based the yield and the feed rate of catalyst. All the reactions were carried out at a gauge pressure of about 2.2 MPa. MST (Mooney Small Thin) measurements were made as a proxy for molecular weight.

Polymers were made according to the conditions described in Table 1. Characterization data are reported in Table 2.

TABLE 1

PEDM Polymers

| Sample | Rxr Temp (° C.) | Ethylene Feed (g/min) | Propylene Feed (g/min) | ENB Feed (g/min) | Catalyst 1 Feed (mol/min) | Activator 1 Feed (mol/min) | Scavenger Feed (mol/min) | Isohexane Feed (g/min) | Toluene Feed (g/min) |
|---|---|---|---|---|---|---|---|---|---|
| 1 | 100 | 3 | 5 | 0.22 | 1.884E−07 | 1.922E−07 | 7.37E−06 | 81.7 | 0.866 |
| 2 | 100 | 3 | 4.5 | 0.22 | 1.884E−07 | 1.922E−07 | 7.37E−06 | 81.7 | 0.866 |
| 3 | 100 | 3 | 4.5 | 0.22 | 2.355E−07 | 2.403E−07 | 7.37E−06 | 81.7 | 1.0825 |
| 4 | 100 | 4 | 6 | 0.36 | 1.884E−07 | 1.922E−07 | 7.37E−06 | 81.8 | 0.866 |
| 5 | 100 | 4 | 5 | 0.36 | 1.884E−07 | 1.922E−07 | 7.37E−06 | 81.8 | 0.866 |
| 6 | 100 | 4 | 4 | 0.36 | 1.884E−07 | 1.922E−07 | 7.37E−06 | 81.8 | 0.866 |
| 7 | 100 | 4 | 4 | 0.36 | 2.825E−07 | 2.883E−07 | 7.37E−06 | 81.8 | 1.299 |
| 8 | 100 | 4 | 4 | 0.36 | 3.767E−07 | 3.844E−07 | 7.37E−06 | 81.8 | 1.732 |
| 9 | 100 | 4.25 | 4 | 0.36 | 3.767E−07 | 3.844E−07 | 7.37E−06 | 81.8 | 1.732 |
| 10 | 100 | 4.25 | 3.5 | 0.36 | 5.651E−07 | 5.766E−07 | 7.37E−06 | 81.8 | 2.598 |
| 11 | 100 | 4 | 6 | 0.45 | 1.884E−07 | 1.922E−07 | 7.37E−06 | 81.8 | 0.866 |
| 12 | 100 | 3 | 7 | 0.45 | 1.884E−07 | 1.922E−07 | 7.37E−06 | 81.8 | 0.866 |
| 13 | 100 | 2 | 8 | 0.45 | 2.355E−07 | 2.403E−07 | 7.37E−06 | 81.8 | 1.0825 |
| 14 | 100 | 1 | 9 | 0.36 | 3.767E−07 | 3.844E−07 | 7.37E−06 | 81.8 | 1.732 |
| 15 | 100 | 2 | 8 | 0.40 | 1.884E−07 | 1.922E−07 | 7.37E−06 | 81.8 | 0.866 |
| 16 | 100 | 2 | 8 | 0.40 | 9.418E−08 | 9.610E−08 | 7.37E−06 | 81.8 | 0.433 |
| 17 | 90 | 2 | 8 | 0.40 | 2.355E−07 | 2.403E−07 | 7.37E−06 | 81.8 | 1.0825 |
| 18 | 90 | 2 | 8 | 0.40 | 1.413E−07 | 1.442E−07 | 7.37E−06 | 81.8 | 0.6495 |
| 19 | 80 | 2 | 8 | 0.40 | 1.884E−07 | 1.922E−07 | 7.37E−06 | 81.8 | 0.866 |
| 20 | 80 | 2 | 8 | 0.40 | 2.825E−07 | 2.883E−07 | 7.37E−06 | 81.8 | 1.299 |
| 21 | 80 | 1 | 9 | 0.45 | 3.767E−07 | 3.844E−07 | 7.37E−06 | 81.8 | 1.732 |
| 22 | 80 | 1 | 9 | 0.45 | 3.767E−07 | 3.844E−07 | 7.37E−06 | 81.8 | 1.732 |
| 23 | 80 | 2 | 8 | 0.40 | 9.418E−08 | 9.610E−08 | 7.37E−06 | 81.8 | 0.433 |
| 24 | 90 | 3 | 7 | 0.45 | 1.884E−07 | 1.922E−07 | 7.37E−06 | 81.8 | 0.866 |
| 25 | 80 | 3 | 7 | 0.45 | 1.884E−07 | 1.922E−07 | 7.37E−06 | 81.8 | 0.866 |
| 26 | 80 | 1 | 9 | 0.40 | 1.884E−07 | 1.922E−07 | 7.37E−06 | 81.8 | 0.866 |

TABLE 2

Characterization of PEDM polymers

| Sample | C2 (wt %) uncorrected | ENB (wt %) | Mooney MST (5 + 4) at 200° C. | Sample quantity (g) |
|---|---|---|---|---|
| 1 | 46.1% | 2.3% | 34.4 | 70.1 |
| 2 | 47.9% | 2.2% | 37 | 70.2 |
| 3 | 46.4% | 1.9% | 28.6 | 78.6 |
| 4 | 49.6% | 2.4% | 41.4 | 141.6 |
| 5 | 53.4% | 2.8% | 51.1 | 132.1 |
| 6 | 57.5% | 3.2% | 61.4 | 122.8 |
| 7 | 56.4% | 3.1% | 40.8 | 199.1 |
| 8 | 53.1% | 3.0% | 30.4 | 157.5 |
| 9 | 55.2% | 3.0% | 34.6 | 322.6 |
| 10 | 50.2% | 3.1% | 24.6 | 340.2 |
| 11 | 56.5% | 3.2% | 48.7 | 263.1 |
| 12 | 41.4% | 3.4% | 33.7 | 257.2 |
| 13 | 31.0% | 3.4% | 17.5 | 218.3 |
| 14 | 18.8% | 2.5% | 17.4 | 47.7 |
| 15 | 32.8% | 2.9% | 21 | 198.3 |
| 16 | 35.2% | 2.8% | 28.6 | 190.8 |
| 17 | 30.4% | 3.0% | 32.8 | 175.4 |
| 18 | 31.6% | 2.8% | 42.5 | 124.3 |
| 19 | 30.4% | 2.9% | 46.2 | 159.7 |
| 20 | 28.4% | 3.2% | 41.7 | 216.4 |
| 21 | 16.1% | 4.0% | 29.9 | 228.4 |
| 22 | 33.0% | 2.8% | 59.8 | 161.1 |
| 23 | 40.2% | 2.8% | 44.1 | 305.8 |
| 24 | 38.5% | 2.7% | 60.6 | 238 |
| 25 | 14.1% | 0.1% | 36.5 | 401.8 |

TABLE 3

Aggregated PEDM samples

| | C2 (wt %) uncorrected | ENB (wt %) | Mooney MST (5 + 4) at 200° C. |
|---|---|---|---|
| 3-1 | 47.0% | 2.3% | 35.5 |
| 3-2 | 49.6% | 2.4% | 41.4 |
| 3-3 | 53.4% | 2.8% | 51.1 |
| 3-4 | 56.4% | 3.1% | 40.8 |
| 3-5 | 53.1% | 3.0% | 30.4 |
| 3-6 | 55.2% | 3.0% | 34.6 |
| 3-7 | 50.2% | 3.1% | 24.6 |
| 3-8 | 56.5% | 3.2% | 48.7 |
| 3-9 | 41.4% | 3.4% | 33.7 |
| 3-10 | 32.0% | 3.1% | 19 |
| 3-11 | 35.20% | 2.82% | 28.6 |
| 3-12 | 30.40% | 2.98% | 32.8 |
| 3-13 | 31.00% | 2.85% | 44.3 |
| 3-14 | 28.38% | 3.16% | 41.7 |
| 3-15 | 32.98% | 2.80% | 59.8 |
| 3-16 | 38.25% | 2.68% | 60.6 |

Aggregation of PEDM Samples

Sixteen samples were then prepared from the above individual samples. Some samples were aggregated with others. The sixteen samples and characterization data are reported in Table 3.

Formulation of TPV

The above aggregated samples in Table 3 were converted to TPV's of Formulation One in two compositions—Formulation One Recipe One and Formulation One Recipe Two (see Table 4) as follows:

TABLE 4

TPV's of Formulation One, Recipes One and Two

|  | PEDM by weight | PP by weight | Plasticizer by weight Sunpar™ 150 |
|---|---|---|---|
| Formulation One Recipe One | 100 | 60 | 80 |
| Formulation One Recipe Two | 100 | 100 | 120 |

Step One: Preparation of Masterbatch

Samples 3-1 to 3-16 were converted to an intermediate masterbatch containing 28 grams isotactic polypropylene, iPP, (PP5341™, 0.8 MFR, ExxonMobil Chemical Company); 141 grams PEDM from Table 3; 42 grams plasticizer oil (Sunpar™ 150); 160 mg Irganox™ 1076; and 168 mg Irgafos™ 168. The blends were mixed for 5 minutes at 200° C. in a Brabender internal mixer. These masterbatch samples are numbered 5-1 to 5-16 corresponding to the samples in Table 3, 3-1 to 3-16.

Masterbatch samples 5-1 to 5-16 were then converted to two TPV's, according to Formulation One Recipes One and Two (see Table 4).

TPV Preparation

The curatives employed for vulcanization included phenolic resin in oil, RIO, stannous chloride, $SnCl_2$, and zinc oxide, ZnO. The RIO composition is 30/70 resin/oil composition (here a paraffinic oil, Sunpar™ 150) the resin used is SP1045™ phenolic resin (octylphenol-formaldehyde resin with methylol active group). Detailed TPV formulations for masterbatches 5-1 to 5-16 are below in Table 6. Amounts are in grams. The adjustment ensures that the final and total oil amount in each formulation is the same. All TPVs were prepared in a Brabender internal mixer running at 180° C. (356° F.) and 100 RPM. PEDM masterbatch and PP were added at the beginning, after 1 minute, ½ of the oil was added, then after 2 min, the RIO was introduced, mixed for 1 min and $SnCl_2$/ZnO was added, mixed for another 5 min, finally the other ½ of oil was added and mixed for 3 minutes. The total mix time was 12 minutes. Data are reported in Tables 7A, 7B, 8A, and 8B.

TABLE 6

Recipe for Formulation One TPV's in Tables 7A, 7B, 8A, and 8B

| Ingredient | Formulation One Recipe One | Formulation One Recipe Two |
|---|---|---|
| Polymers | | |
| PEDM Master Batch (5-1 through 5-16) (g) | 37.5 | 30.0 |
| Plasticizer Sunpar™ 150 (g) | 12.50 | 15.00 |
| iPP 5341 (g) | 10.0 | 15.0 |
| Curatives | | |
| ROI (SP1045™ phenolic resin in oil Sunpar™ 150) (g) | 1.3 | 0.9 |
| $SnCl_2$ (g) | 0.2 | 0.1 |
| ZnO (g) | 0.5 | 0.4 |

TABLE 7A

Particle size of TPV's- Formulation One Recipe One

| TPV | PEDM Source | Area coverage | Particle count | Dn | Dw | Dv | PDI (Mw/Mn) | Dv/Dn |
|---|---|---|---|---|---|---|---|---|
| 7-1 | 3-1 | 0.56 | 10433 | 774.38 | 971.81 | 1151.29 | 1.25 | 1.49 |
| 7-2 | 3-2 | 0.52 | 9394 | 783.70 | 996.29 | 1182.38 | 1.27 | 1.51 |
| 7-3 | 3-3 | 0.60 | 3698 | 1381.44 | 1669.55 | 1897.22 | 1.21 | 1.37 |
| 7-4 | 3-4 | 0.52 | 9978 | 771.33 | 937.28 | 1082.00 | 1.22 | 1.40 |
| 7-5 | 3-5 | 0.57 | 10037 | 769.12 | 1023.74 | 1283.62 | 1.33 | 1.67 |
| 7-6 | 3-6 | 0.55 | 10132 | 786.23 | 969.53 | 1129.15 | 1.23 | 1.44 |
| 7-7 | 3-7 | 0.55 | 9915 | 781.69 | 991.80 | 1186.46 | 1.27 | 1.52 |
| 7-8 | 3-8 | 0.53 | 8739 | 807.61 | 1039.63 | 1269.90 | 1.29 | 1.57 |
| 7-9 | 3-9 | 0.52 | 9228 | 805.01 | 987.98 | 1143.25 | 1.23 | 1.42 |
| 7-10 | 3-10 | 0.49 | 9966 | 715.32 | 983.84 | 1214.14 | 1.38 | 1.70 |
| 7-11 | 3-11 | 0.51 | 8950 | 808.31 | 992.02 | 1150.49 | 1.23 | 1.42 |
| 7-12 | 3-12 | 0.51 | 8837 | 808.39 | 992.01 | 1152.49 | 1.23 | 1.43 |
| 7-13 | 3-13 | 0.51 | 8965 | 804.83 | 987.27 | 1144.39 | 1.23 | 1.42 |
| 7-14 | 3-14 | 0.50 | 8453 | 811.95 | 1022.10 | 1213.24 | 1.26 | 1.49 |
| 7-15 | 3-15 | 0.57 | 5087 | 1153.19 | 1385.12 | 1575.64 | 1.20 | 1.37 |
| 7-16 | 3-16 | 0.63 | 6748 | 1029.25 | 1269.68 | 1486.57 | 1.23 | 1.44 |

TABLE 7B

Mechanical Properties of TPV's- Formulation One Recipe One

| TPV | PEDM Source | Break stress (MPa) | Strain (%) | Flex mod (MPa) | 1st Hyst (J) | 2nd Hyst (J) | Shore A Hardness |
|---|---|---|---|---|---|---|---|
| 7-1 | 3-1 | 6 | 290 | 22 | 0.87 | 0.42 | 68 |
| 7-2 | 3-2 | 6.72 | 356 | 21 | 0.70 | 0.31 | 67 |
| 7-3 | 3-3 | 5.56 | 291 | 35 | 0.95 | 0.60 | 69 |
| 7-4 | 3-4 | 5.56 | 318 | 22 | 0.83 | 0.44 | 67 |
| 7-5 | 3-5 | 7.59 | 325 | 24 | 1.05 | 0.60 | 69 |
| 7-6 | 3-6 | 7.39 | 363 | 21 | 1.03 | 0.60 | 68 |
| 7-7 | 3-7 | 4.81 | 226 | 20 | 0.87 | 0.49 | 67 |
| 7-8 | 3-8 | 7.88 | 363 | 25 | 1.03 | 0.59 | 71 |
| 7-9 | 3-9 | 7.04 | 379 | 20 | 0.97 | 0.56 | 68 |
| 7-10 | 3-10 | 6.99 | 344 | 22 | 1.03 | 0.57 | 66 |
| 7-11 | 3-11 | 6.47 | 344 | 19 | 0.82 | 0.47 | 66 |
| 7-12 | 3-12 | 7.34 | 358 | 20 | 0.84 | 0.48 | 67 |
| 7-13 | 3-13 | 7.07 | 349 | 19 | 0.87 | 0.51 | 65 |
| 7-14 | 3-14 | 8.04 | 360 | 20 | 1.09 | 0.63 | 67 |
| 7-15 | 3-15 | 5.59 | 286 | 34 | 0.89 | 0.57 | 68 |
| 7-16 | 3-16 | 6.14 | 282 | 38 | 0.93 | 0.59 | 69 |

TABLE 8A

Particle size of TPV's- Formulation One Recipe Two

| TPV | PEDM Source | Area coverage | Particle count | Dn | Dw | Dv | PDI (Mw/Mn) | Dv/Dn |
|---|---|---|---|---|---|---|---|---|
| 8-1 | 3-1 | 0.53 | 5863 | 811.3 | 1060.9 | 1292.1 | 1.31 | 1.59 |
| 8-2 | 3-2 | 0.57 | 6533 | 1005.2 | 1213.2 | 1394.2 | 1.21 | 1.39 |
| 8-3 | 3-3 | 0.53 | 5692 | 889.6 | 1325.8 | 1624 | 1.49 | 1.83 |
| 8-4 | 3-4 | 0.53 | 5863 | 1026.2 | 1234.5 | 1410 | 1.2 | 1.37 |
| 8-5 | 3-5 | 0.51 | 5808 | 984.1 | 1259.7 | 1462.1 | 1.28 | 1.49 |
| 8-6 | 3-6 | 0.53 | 10239 | 749.9 | 954.4 | 1153.8 | 1.27 | 1.54 |
| 8-7 | 3-7 | 0.53 | 10006 | 768.4 | 963.1 | 1147.2 | 1.25 | 1.49 |
| 8-8 | 3-8 | 0.58 | 8387 | 820.5 | 1170.8 | 1577.4 | 1.43 | 1.92 |
| 8-9 | 3-9 | 0.54 | 9872 | 764.9 | 985.8 | 1212.1 | 1.29 | 1.59 |
| 8-10 | 3-10 | 0.52 | 9708 | 763.9 | 980 | 1190.4 | 1.28 | 1.56 |
| 8-11 | 3-11 | 0.52 | 9568 | 770.1 | 979.8 | 1185.5 | 1.27 | 1.54 |
| 8-12 | 3-12 | 0.49 | 9374 | 769.4 | 951.6 | 1126.2 | 1.24 | 1.46 |
| 8-13 | 3-13 | 0.6 | 10580 | 771 | 1019.2 | 1300.6 | 1.32 | 1.69 |
| 8-14 | 3-14 | 0.47 | 8631 | 786.2 | 955.3 | 1099.1 | 1.22 | 1.4 |
| 8-15 | 3-15 | 0.54 | 6047 | 864.4 | 1461.9 | 1882.2 | 1.69 | 2.18 |
| 8-16 | 3-16 | 0.51 | 6904 | 811.1 | 1277.2 | 1613 | 1.58 | 1.99 |

TABLE 8B

Mechanical Properties of TPV's- Formulation One Recipe Two

| TPV | PEDM Source | Elongation (%) | Modulus (MPa) | 1st hyst (J) | 2nd hsyt (J) | Shore A Hardness |
|---|---|---|---|---|---|---|
| 8-1 | 3-1 | 323 | 41.3 | 1.03 | 0.41 | 78 |
| 8-2 | 3-2 | 410 | 43.2 | 1.1 | 0.52 | 77 |
| 8-3 | 3-3 | 385 | 57.2 | 1.17 | 0.62 | 80 |
| 8-4 | 3-4 | 419 | 43.4 | 1.18 | 0.57 | 78 |
| 8-5 | 3-5 | 375 | 41.9 | 1.1 | 0.49 | 78 |
| 8-6 | 3-6 | 354 | 43.4 | 1.1 | 0.5 | 77 |
| 8-7 | 3-7 | 406 | 39 | 1.09 | 0.52 | 75 |
| 8-8 | 3-8 | 418 | 44.7 | 1.18 | 0.52 | 78 |
| 8-9 | 3-9 | 501 | 42.1 | 1.13 | 0.55 | 77 |
| 8-10 | 3-10 | 379 | 38.1 | 1 | 0.46 | 76 |
| 8-11 | 3-11 | 493 | 38.2 | 1.09 | 0.54 | 76 |
| 8-12 | 3-12 | 409 | 37.4 | 1.08 | 0.53 | 77 |
| 8-13 | 3-13 | 486 | 39 | 1.14 | 0.56 | 77 |
| 8-14 | 3-14 | 439 | 40.9 | 1.1 | 0.53 | 78 |
| 8-15 | 3-15 | 486 | 57.2 | 1.12 | 0.59 | 77 |
| 8-16 | 3-16 | 392 | 62.5 | 1.28 | 0.62 | 81 |

PEDM Synthesis for Formulation Two

PEDMs were produced using a solution process in a 0.5-liter continuous stirred-tank reactor (autoclave reactor). The autoclave reactor was equipped with a stirrer, a water-cooling/steam-heating element with a temperature controller, and a pressure controller. Solvents and monomers were first purified by passing through a three-column purification system. The purification system consisted of an Oxiclear column (Model #RGP-R1-500 from Labclear) followed by a 5A and a 3A molecular sieve column. Purification columns were regenerated periodically whenever there was evidence of low catalyst activity. Isohexane was used as a solvent. Solvent was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to a reactant inlet manifold. A mixture of isohexane and tri-n-octylaluminum (TNOAL) and ethylene norbornene (ENB) was also added to the reactant inlet manifold through a separate line and the combined mixture of monomers and solvent was fed into the reactor using a single tube. Tri-n-octylaluminum (TNOAL, available from Sigma Aldrich, Milwaukee, Wis.) solution was diluted to a concentration of 1.843×10-6 using isohexane.

Isohexane and TNOAL solutions were fed using Pulsa pumps and their flow rate was controlled using a pump calibration curve. Purified propylene, and ENB were also fed using Pulsa pumps but their flow rate was controlled using mass-flow controllers. The feed rate of purified ethylene was also regulated using a mass flow controller. Ethylene and propylene combined into a single line before entering a manifold upstream of the reactor. Isohexane, TNOAL solution, and ENB solution lines also combined in a single line before entering the same manifold. The resulting two lines merged further downstream and the combined mixture of monomers and solvent was fed into the reactor using a single tube.

Catalyst used in these examples was dimethylsilylene(2,7,7-trimethyl-3,6,7,8-tetrahydro-as-indacen-3-yl)(t-butylamido)titanium dimethyl and the activator used was dimethylaniliniumtetrakis(heptafluoronaphthyl)borate. Catalyst solution was prepared daily and used on the same day. The solution was prepared by dissolving 80 mg of the catalyst and 99.1 mg of the activator in 450 ml toluene (catalyst concentration=1.884×10-07 mol/ml, catalyst/activator (molar ratio)=0.98). This solution was pumped into the reactor through a designated dip-tube at a desired rate using an Isco pump.

Composition was controlled by adjusting the feed ratio of the monomers while the molecular weight of the polymer, under fixed feed conditions, was controlled using temperature. The collected samples were first placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. The ethylene and ENB content of the polymer was determined by FTIR. The monomer conversions were calculated using the polymer yield, composition and the amount of monomers fed into the reactor. Catalyst activity (also referred as to catalyst productivity) was calculated based the yield and the feed rate of catalyst. All the reactions were carried out at a gauge pressure of about 2.2 MPa. MST (Mooney Small Thin) measurements were made as a proxy for molecular weight. Polymers were made according to the conditions described in Table 9 and the characterization data are reported in Table 10.

TABLE 9

PEDM Samples

| Sample ID | C2 (wt %) uncorrected | ENB (wt %) | Cat Efficiency (g poly/ g cat) | Mooney MST (5 + 4) at 200° C. | Sample quantity (g) |
|---|---|---|---|---|---|
| 9-1 | 35.10% | 5.60% | 92490 | 79.11 | 89.9 |
| 9-2 | 33.80% | 3.50% | 99824 | 45.4 | 113.2 |
| 9-3 | 32.80% | 3.60% | 84105 | 66 | 109 |
| 9-4 | 31.90% | 1.70% | 92438 | 54.5 | 119.8 |
| 9-5 | 32.10% | 3.50% | 76852 | 52.3 | 124.5 |
| 9-6 | 33.10% | 3.70% | 57170 | 55.1 | 120.4 |
| 9-7 | 14.20% | 3.40% | 113580 | 27.8 | 202.4 |
| 9-8 | 14.70% | 3.40% | 126362 | 34.3 | 174 |
| 9-9 | 15.80% | 3.50% | 110022 | 42.2 | 454.5 |
| 9-10 | 22.60% | 3.70% | 118827 | 60.75 | 154 |
| 9-11 | 21.80% | 3.60% | 110494 | 54.2 | 161.1 |
| 9-12 | 35.00% | 5.50% | 46078 | 35.6 | 126.9 |
| 9-13 | 34.50% | 3.10% | 63014 | 43 | 245 |
| 9-14 | 22.80% | 3.70% | 122299 | 57.6 | 317 |
| 9-15 | 55.50% | 4.10% | 85438 | 89.6 | 304.5 |

TABLE 10

Characterization of PEDM Samples

| Sample ID | Mw (g/mol) | Mn (g/mol) | Mz (g/mol) | Mw/Mn (g/mol) |
|---|---|---|---|---|
| 9-1 | 252870 | 107894 | 477125 | 2.34 |
| 9-2 | 753226 | 322661 | 1482937 | 2.33 |
| 9-3 | 552227 | 240021 | 1055490 | 2.30 |
| 9-4 | 609585 | 268969 | 1138523 | 2.27 |
| 9-5 | 558314 | 242187 | 1015968 | 2.31 |
| 9-6 | 550847 | 230979 | 1014947 | 2.38 |
| 9-7 | 512440 | 227138 | 930696 | 2.26 |
| 9-8 | 523470 | 233654 | 968590 | 2.24 |
| 9-9 | 628483 | 279375 | 1124578 | 2.25 |
| 9-10 | 690849 | 301194 | 1260055 | 2.29 |
| 9-11 | 660152 | 289470 | 1202015 | 2.28 |
| 9-12 | 421928 | 172729 | 819604 | 2.44 |
| 9-13 | 466408 | 201065 | 869371 | 2.32 |
| 9-14 | 695352 | 302513 | 1281416 | 2.30 |
| 9-15 | 581623 | 178942 | 1443793 | 3.25 |

Selected PEDM's were combined with oil (either 75 or 100 phr) to make oil-extended PEDM's. These oil extended PEDM's were then converted into TPV's (Formulation Two—Recipe One or Two). All TPVs were prepared in a Brabender internal mixer running at 180° C. (356° F.) and 100 RPM. PEDM masterbatch and PP were added at the beginning, after 1 minute, ½ of the oil was added, then after 2 min, the RIO was introduced, mixed for 1 min and SnCl$_2$/ZnO was added, mixed for another 5 min, finally the other ½ of oil was added and mixed for 3 minutes. The total mix time was 12 minutes. Formulation Two recipes (in phr and grams) are reported in Table 12. The oil-extended PEDMs used in recipes One and Two are reported in Table 13. TPV's of selected oil extended PEDMs are reported in Table 14.

TABLE 12

Recipes for Formulation Two

| Sample Formula | Formulation Two, Recipe One (phr) | Formulation Two, Recipe Two (phr) | Formulation Two, Recipe One (grams) | Formulation Two, Recipe Two (grams) |
|---|---|---|---|---|
| EPDM or PEDM | 100 | 100 | 30.22 | 34.53 |
| Oil incorporated in EPDM | 75 | 100 | 4.66 | 4.66 |
| PP5341 | 26.97 | 26.97 | 4.14 | 4.14 |
| AMP 49974 (carbon black masterbatch) | 23.96 | 23.96 | 7.25 | 7.25 |
| Icecap K (Clay) | 42 | 42.00 | 0.26 | 0.26 |
| ZnO | 1.5 | 1.50 | 2.26 | 0.0 |
| Paramount 6001R (pre) | 13.1 | 0.00 | 1.31 | 1.31 |
| RIO-HRJ16261 (phenolic resin in oil Paralux™ 6001R) | 7.56 | 7.56 | 0.29 | 0.29 |
| SnCl$_2$ masterbatch | 1.67 | 1.67 | 9.62 | 7.57 |
| Paramount™ 6001R (post) | 55.72 | 43.82 | 30.22 | 34.530.00 |

TABLE 13

Oil extension of PEDM for Formulation Two

| Sample | Recipe One 9-9A1 | Recipe One 9-13A2 | Recipe One 9-14A3 | Recipe One 9-15A4 | Recipe Two 9-9B1 | Recipe Two 9-13B2 | Recipe Two 9-14B3 |
|---|---|---|---|---|---|---|---|
| Formula (phr) | | | | | | | |
| 9-9 | 100.00 | | | | 100.00 | | |
| 9-13 | | 100.00 | | | | 100.00 | |
| 9-14 | | | 100.00 | | | | 100.00 |
| 9-15 | | | | 100.00 | | | |
| Paramount 6001R (pre) | 75 | 75 | 75 | 75 | 100 | 100 | 100 |
| Formula (grams) | | | | | | | |
| 9-9 | 34.29 | | | | 30.00 | | |
| 9-13 | | 34.29 | | | | 30.00 | |

TABLE 13-continued

Oil extension of PEDM for Formulation Two

|  | Recipe One | Recipe One | Recipe One | Recipe One Sample | Recipe Two | Recipe Two | Recipe Two |
|---|---|---|---|---|---|---|---|
|  | 9-9A1 | 9-13A2 | 9-14A3 | 9-15A4 | 9-9B1 | 9-13B2 | 9-14B3 |
| 9-14 |  |  | 34.29 |  |  |  | 30.00 |
| 9-15 |  |  |  | 34.29 |  |  |  |
| Paramount 6001R (pre) | 25.71 | 25.71 | 25.71 | 25.71 | 30.00 | 30.00 | 30.00 |
| Total | 60.00 | 60.00 | 60.00 | 60.00 | 60.00 | 60.00 | 60.00 |

TABLE 14

Examples of Formulation Two

| | Example | | | | | |
|---|---|---|---|---|---|---|
| | 14D Recipe One | 14A Recipe Two | 14B Recipe Two | 14C Recipe Two | Comp. Recipe One | Comp. Recipe Two |
| Formula (grams) | | | | | | |
| 9-9 B1 |  | 34.24 |  |  |  |  |
| 9-13 B2 |  |  | 34.24 |  |  |  |
| 9-14 B3 |  |  |  | 34.24 |  |  |
| 9-15 A1 | 29.96 |  |  |  |  |  |
| PP5341 ™ | 4.46 | 4.46 | 4.46 | 4.46 | 4.46 | 4.46 |
| V3666 EPDM w/75 phr oil extension |  |  |  |  | 29.96 |  |
| Keltan 597Q EPDM w/ 100 phr oil extension |  |  |  |  |  | 34.24 |
| AMP 49974 ™ CB | 4.10 | 4.10 | 4.10 | 4.10 | 4.10 | 4.10 |
| IcecapK (Clay) | 7.19 | 7.19 | 7.19 | 7.19 | 7.19 | 7.19 |
| ZnO | 0.26 | 0.26 | 0.26 | 0.26 | 0.26 | 0.26 |
| Paramount 6001R (pre) | 2.24 |  |  |  | 2.24 | 2.24 |
| RIO HRJ16261 (Paralux 6001R) | 2.59 | 2.59 | 2.59 | 2.59 | 2.59 | 2.59 |
| SnCl$_2$ MB | 0.57 | 0.57 | 0.57 | 0.57 | 0.57 | 0.57 |
| Paramount 6001R (post) | 8.63 | 6.60 | 6.60 | 6.60 | 8.63 | 6.60 |
| Properties | | | | | | |
| 25% Tension Set | 6.83% | 5.67% | 5.50% | 5.33% | 7.50% | 5.67% |
| 50% Tension Set | 13.17% | 10.67% | 10.50% | 9.83% | 13.50% | 10.75% |
| Morphology | | | | | | |
| dn | 722 | 647.293 | 657.8914 | 678.2227 | 1234 | 1206 |
| dw | 1083 | 873.6818 | 943.2292 | 935.5402 | 1547 | 1582 |
| dv | 1488 | 1087.406 | 1225.162 | 1172.386 | 1806 | 1979 |
| dw/dn | 1.50 | 1.349747 | 1.433716 | 1.3794 | 1.25 | 1.31 |
| dv/dw | 1.37 | 1.244625 | 1.298902 | 1.253165 | 1.17 | 1.25 |
| Mechanicals | | | | | | |
| DMTA |  |  |  |  | Figure | figure |
| Tensile (median) | 5.29 | 4.53 | 4.76 | 5.31 | 4.26 | 3.87 |
| %Strain (median) | 304.21 | 303.86 | 253.48 | 279.34 | 233.55 | 194.92 |
| Shore A Hardness (median) | 55.2 | 48.4 | 51.6 | 52.1 | 52.7 | 53.7 |
| Hysterisis | | | | | | |
| Energy (first deformation cycle) Median | 0.61779 | 0.55706 | 0.63939 | 0.65136 | 0.56475 | 0.582605 |
| Energy (second deformation cycle) Median | 0.40556 | 0.33471 | 0.41809 | 0.42872 | 0.40372 | 0.421115 |

While the present disclosure has been described and illustrated by reference to particular embodiments, those of ordinary skill in the art will appreciate that the disclosure lends itself to variations not necessarily illustrated herein. For this reason, then, reference should be made solely to the appended claims for purposes of determining the scope of the present disclosure. Further, the term "comprising" is considered synonymous with the term "including". Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A thermoplastic vulcanizate comprising a polypropylene matrix phase in which cross-linked rubber particles are dispersed, the thermoplastic vulcanizate comprising the reaction product of a mixture comprising:
   (a) at least 10 wt % of isotactic polypropylene;
   (b) at least 30 wt % of a propylene-ethylene-diene terpolymer (PEDM) rubber containing at least 60 wt % propylene-derived units and less than or equal to 25 wt % of ethylene-derived units, where the PEDM is amorphous; and
   (c) at least 0.015 wt % of at least one curative,
   wherein the mixture is formed without adding an ethylene-propylene-diene terpolymer (EPDM) rubber, and the percentages of components (a) to (c) are based on the total weight of the mixture.

2. The thermoplastic vulcanizate of claim 1, wherein the PEDM comprises 5 to 18 wt % of ethylene-derived units.

3. The thermoplastic vulcanizate of claim 1, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

4. The thermoplastic vulcanizate of claim 1, wherein the PEDM has a viscosity from 10 to 90 MST (5+4) at 230° C.

5. The thermoplastic vulcanizate of claim 1, in which the amount of PEDM is from 35 to 70 wt % of the mixture.

6. The thermoplastic vulcanizate of claim 1, in which the amount of PEDM is from 40 to 60 wt % of the mixture.

7. The thermoplastic vulcanizate of claim 1, wherein the particle size dispersity index (PSDI) of the crosslinked rubber particles is less than 3.

8. The thermoplastic vulcanizate of claim 1, wherein the PEDM has a melting point (mp) which is undetectable.

9. The thermoplastic vulcanizate of claim 1, wherein the PEDM has a heat of fusion (Hf) which is undetectable.

10. A thermoplastic vulcanizate comprising an isotactic polypropylene matrix phase in which cross-linked rubber particles are dispersed, the thermoplastic vulcanizate comprising the reaction product of a mixture comprising:
    (a) 20 to 30 wt % of isotactic polypropylene (iPP);
    (b) 35 to 70 wt % of a propylene-ethylene-diene terpolymer (PEDM) containing at least 60 wt % propylene-derived units and less than or equal to 25 wt % of ethylene-derived units, where the PEDM is amorphous;
    (c) at least 10 to 30 wt % of a diluent;
    (d) 0 to less than 30 wt % of an ethylene-propylene-diene terpolymer (EPDM) containing at least 50 wt % of ethylene-derived units; and
    (e) 0.5 to 5.0 wt % of at least one curative;
    wherein the percentages of components (a) to (e) are based on the total weight of the mixture.

11. The thermoplastic vulcanizate of claim 10, wherein the PEDM comprises 5 to 18 wt % of ethylene-derived units.

12. The thermoplastic vulcanizate of claim 10, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

13. The thermoplastic vulcanizate of claim 10, wherein the PEDM has a viscosity from 10 to 90 MST (5+4) at 230° C.

14. The thermoplastic vulcanizate of claim 10, in which the amount of PEDM is from 40 to 60 wt % of the mixture.

15. The thermoplastic vulcanizate of claim 10, wherein the particle size dispersity index (PSDI) of the crosslinked rubber particles is less than 3.

16. The thermoplastic vulcanizate of claim 10, wherein the PEDM has a melting point (mp) which is undetectable.

17. The thermoplastic vulcanizate of claim 10, wherein the PEDM has a heat of fusion (Hf) which is undetectable.

18. The thermoplastic vulcanizate of claim 10, wherein the ethylene-propylene-diene terpolymer (EPDM) contains at least 50 wt % of ethylene-derived units.

19. The composition of claim 1, wherein, the TPV has an elongation at break of 200% or more.

20. The composition of claim 1, wherein, the TPV has a break stress of 3 MPa or more.

21. The composition of claim 1, wherein, the TPV has a tension set at 25% elongation of 7% or less.

22. The composition of claim 1, wherein, the TPV has a tension set at 50% elongation of 14% or less.

23. The composition of claim 1, wherein, the TPV has a number average particle size diameter of the rubber particles (PEDM, and EPDM if present) of 800 nm or less.

24. The composition of claim 1, wherein, the TPV has a dispersity of crosslinked particle size diameter of the rubber particles (PEDM, and EPDM if present) of 1.6 or less.

25. The thermoplastic vulcanizate of claim 1, wherein the thermoplastic vulcanizate has a Dw/Dn of 7 or less.

26. The thermoplastic vulcanizate of claim 1, wherein the thermoplastic vulcanizate has a tension set at 50% elongation of 14% or less.

27. The thermoplastic vulcanizate of claim 1, wherein the thermoplastic vulcanizate has a tension set at 50% elongation of 14% or less and a Dw/Dn of 7 or less.

28. The composition of claim 1, wherein, the TPV has:
    1) an elongation at break of 200% or more;
    2) a break stress of 3 MPa or more;
    3) a tension set at 25% elongation of 7% or less;
    4) a tension set at 50% elongation of 14% or less;
    5) an number average particle size diameter of the rubber particles (PEDM, and EPDM if present) of 800 nm or less; and
    6) a dispersity of crosslinked particle size diameter of the rubber particles (PEDM, and EPDM if present) of 1.6 or less.

* * * * *